United States Patent [19]
Yada et al.

[11] Patent Number: 5,260,836
[45] Date of Patent: Nov. 9, 1993

[54] APPARATUS FOR REPRODUCING DIGITAL AND ANALOG AUDIO SIGNALS

[75] Inventors: Horoaki Yada; Yutaka Soda; Keisuke Fujiwara; Satoru Seko; Munekatsu Fukuyama; Tetsuo Sekiya, all of Kanagawa, Japan

[73] Assignee: Sony Corporation, Tokyo, Japan

[21] Appl. No.: 618,906

[22] Filed: Nov. 28, 1990

[30] Foreign Application Priority Data

Nov. 29, 1989 [JP] Japan .................................. 1-310452

[51] Int. Cl.⁵ ........................ G11B 5/09; G11B 15/12
[52] U.S. Cl. .......................................... 360/32; 360/63
[58] Field of Search ..................... 360/32, 46, 61, 63, 360/65, 113

[56] References Cited

U.S. PATENT DOCUMENTS

| | | | |
|---|---|---|---|
| 4,321,622 | 3/1982 | Jerome et al. | 358/128.5 |
| 4,590,524 | 5/1986 | Okamoto et al. | 360/32 |
| 4,752,840 | 6/1988 | Juso et al. | 360/22 |

FOREIGN PATENT DOCUMENTS

| | | |
|---|---|---|
| 109674 | 5/1984 | European Pat. Off. |
| 60-182503 | 9/1985 | Japan |

OTHER PUBLICATIONS

Patent Abstracts of Japan, vol. 2, No. 115 (E-59) Sep. 25, 1978 & JP-A-53 080 205 (Fujitsu KK) Jul. 15, 1978.
Patent Abstracts of Japan, vol. 10, No. 034 (P-427) Feb. 8, 1986 & JP-A-60 182 503 (Sony K.K.) Sep. 18, 1985.
Patent Abstracts of Japan, vol. 8, No. 192 (P-298) (1629) Apr. 9, 1984 & JP-A-59 079 403 (Sony K.K.) Aug. 5, 1984.
Patent Abstracts of Japan, vol. 8, No. 51 (P-259) (1488) Aug. 3, 1984 & JP-A-58 200 412 (Nippon Colubia K.K.) Nov. 22, 1983.
Patent Abstracts of Japan, vol. 3, No. 145 (E-155) Nov. 30, 1979 & JP-A-54 123 013 (Matsushita) Aug. 25, 1979.
Funkschau vol. 58, No. 23, Nov. 1985, Munchen, D. pp. 36-39; H. P. Siebert: 'Das Magnetband halt Schritt'.
Funkschau No. 13, Jun. 183, Munchen, D. pp. 67-68; W. Bruch: 'Von der Tonwalze zur Bildplatte'.

Primary Examiner—Donald T. Hajec
Assistant Examiner—Won Tae C. Kim
Attorney, Agent, or Firm—William S. Frommer; Alvin Sinderbrand

[57] ABSTRACT

Apparatus is provided for reproducing either M channels of digital audio signals recorded in longitudinal tracks on a record medium or an analog audio signal recorded in one or two stereo tracks. M heads are used to reproduce the M channels of digital audio signals and N of those heads ($N \leq M$) are used to reproduce the analog audio signal. The reproduced digital or analog audio signals are multiplexed and digitized. When digital audio signals are reproduced, the digitized multiplexed signals are digitally processed and then converted to analog form. When analog audio signals are reproduced, the digitized multiplexed signals are summed such that signals reproduced by the N heads are combined to form a digital representation of the recorded analog audio signal. The summed signals then are converted to analog form to recover the original analog audio signal.

28 Claims, 13 Drawing Sheets

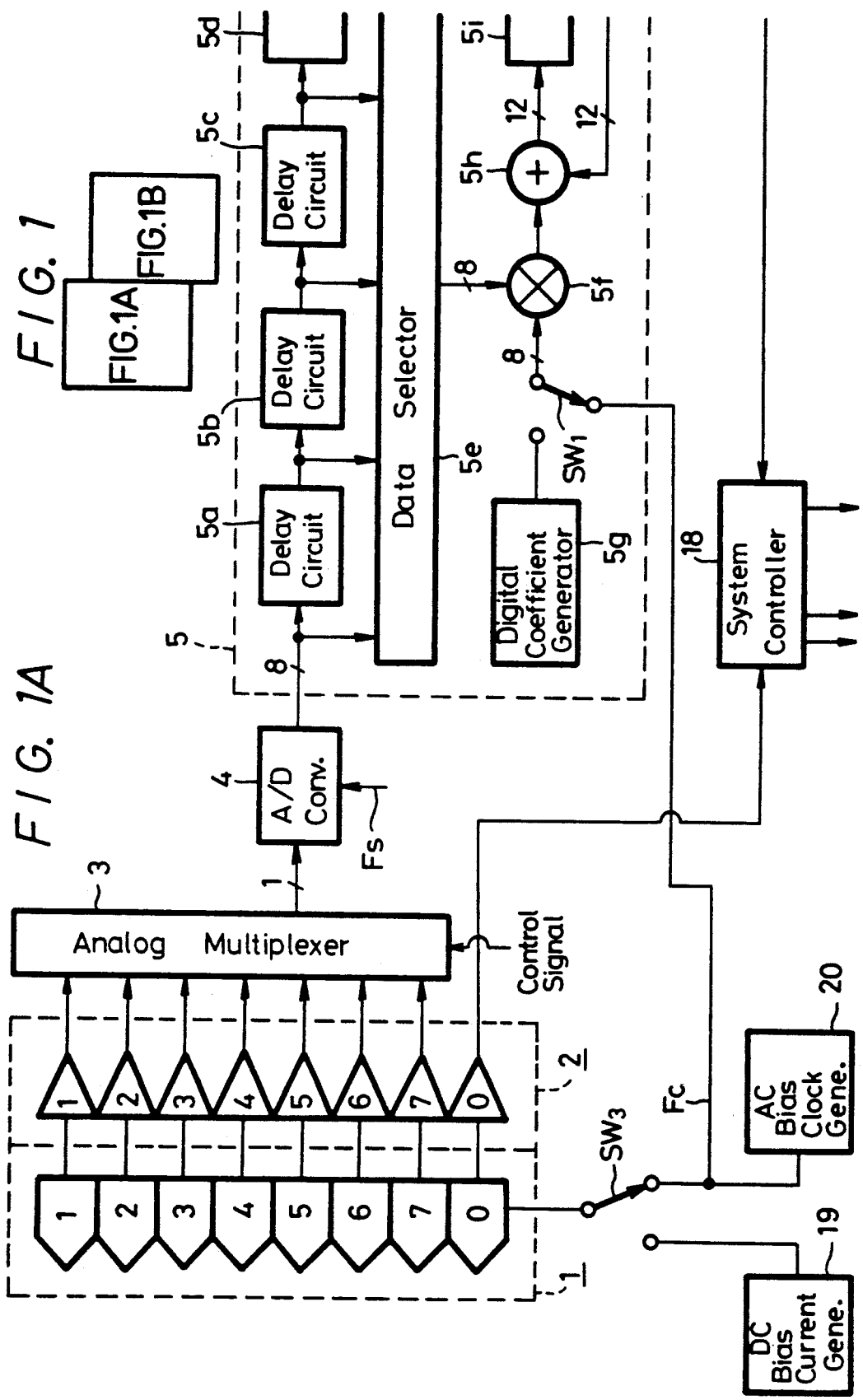

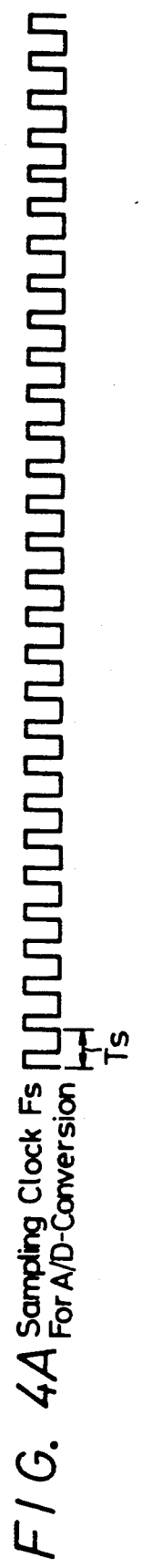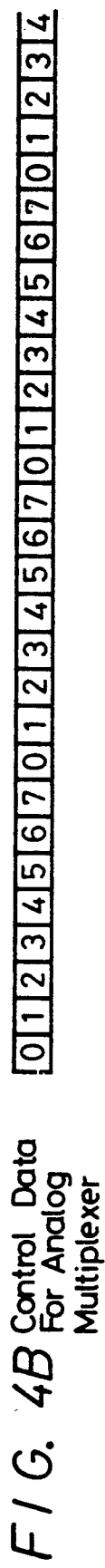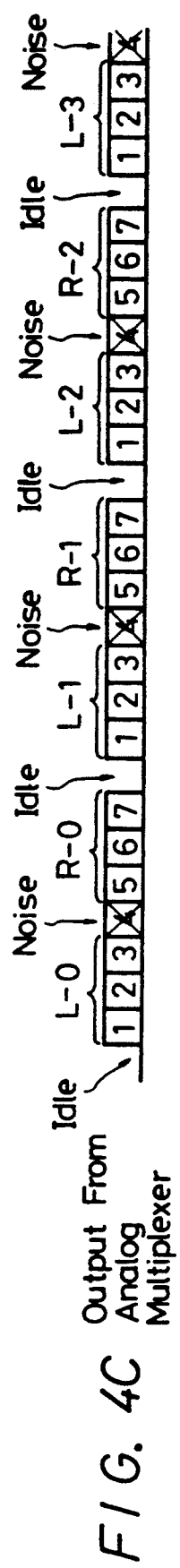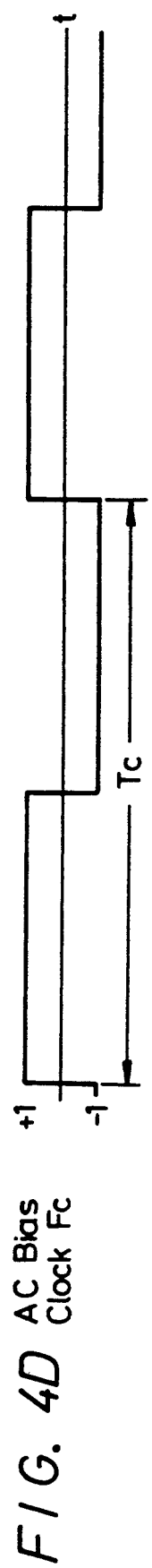
FIG. 4A Sampling Clock Fs For A/D-Conversion
FIG. 4B Control Data For Analog Multiplexer
FIG. 4C Output From Analog Multiplexer
FIG. 4D AC Bias Clock Fc

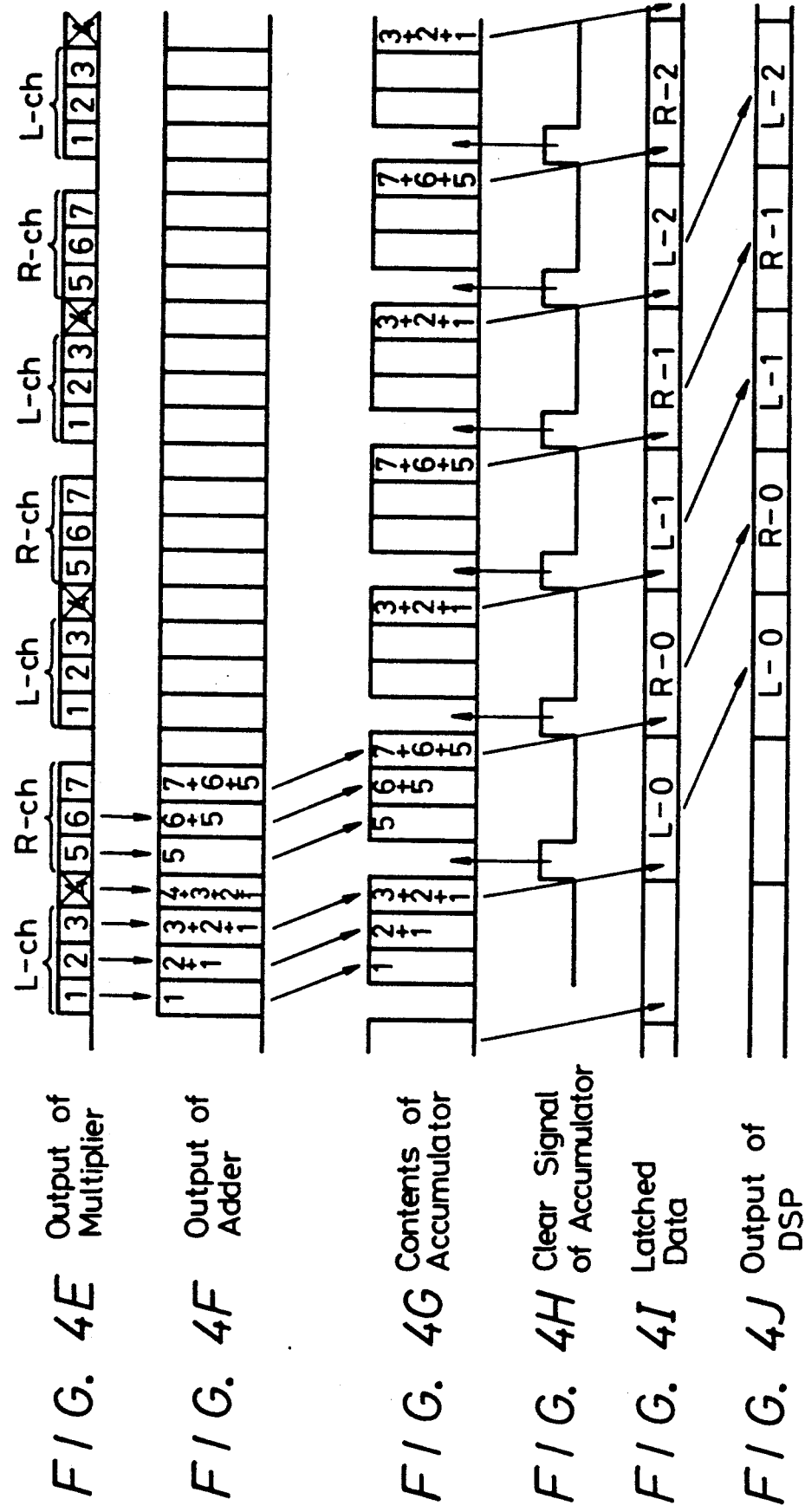
FIG. 4E Output of Multiplier
FIG. 4F Output of Adder
FIG. 4G Contents of Accumulator
FIG. 4H Clear Signal of Accumulator
FIG. 4I Latched Data
FIG. 4J Output of DSP

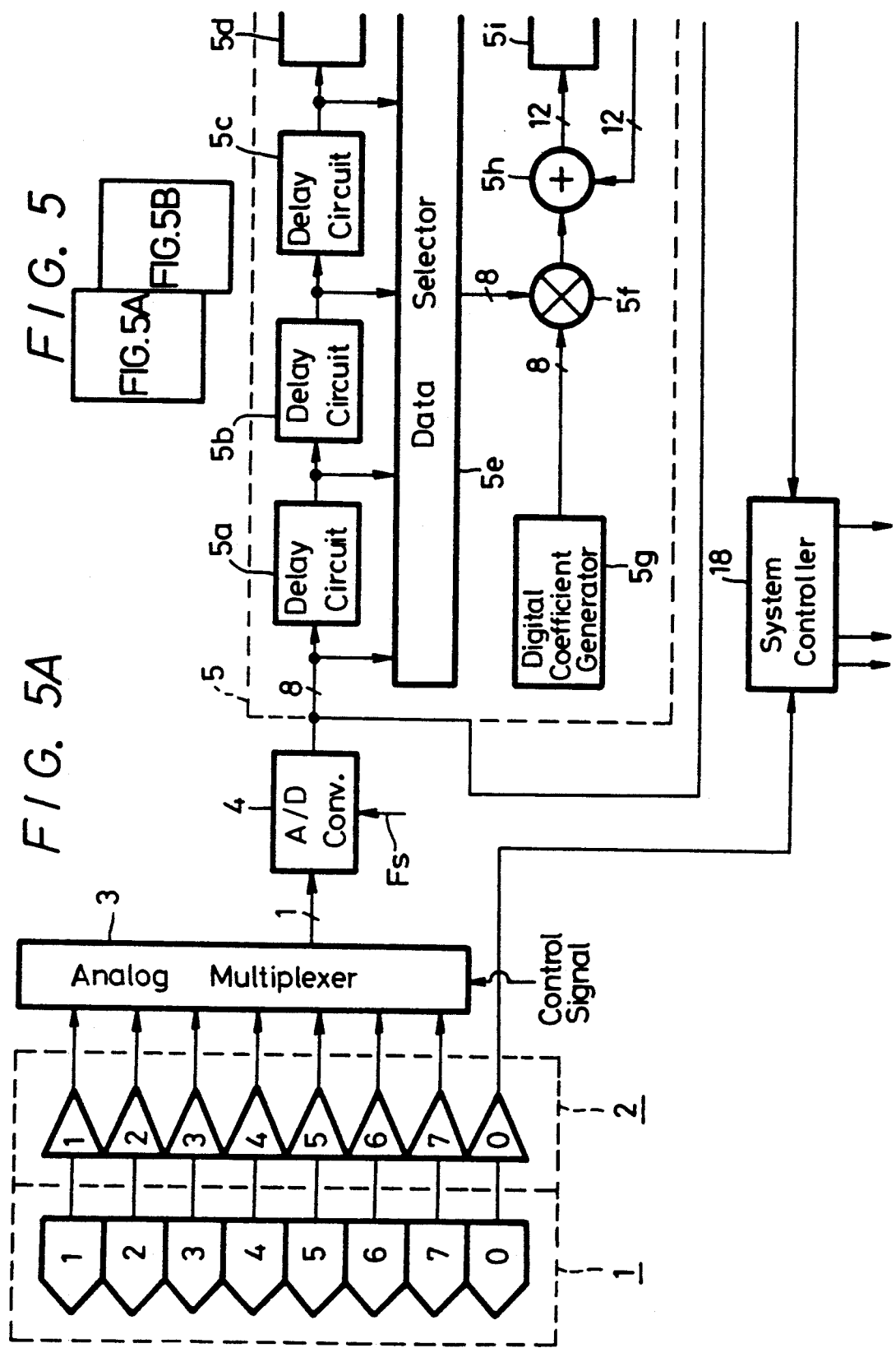

F I G. 12
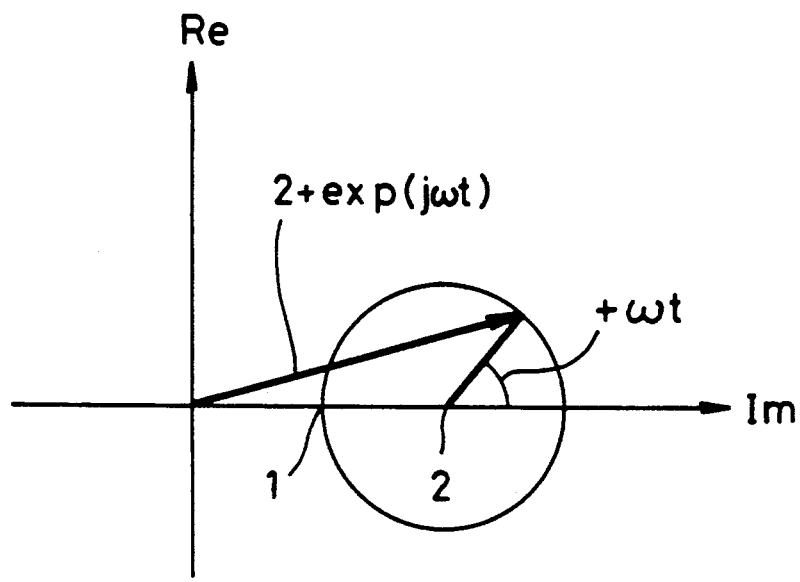
F I G. 13
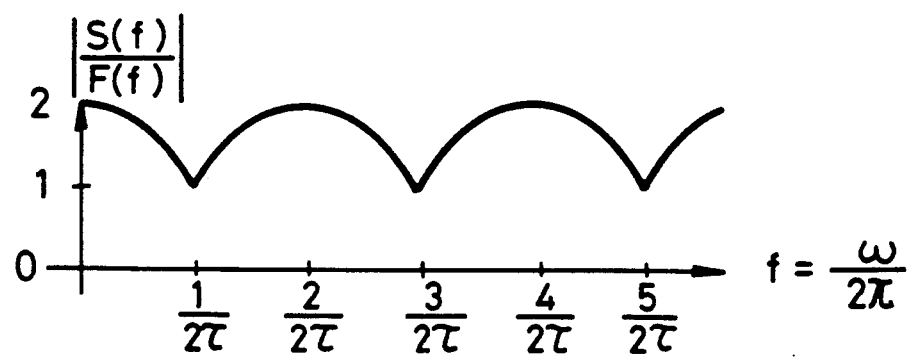

APPARATUS FOR REPRODUCING DIGITAL AND ANALOG AUDIO SIGNALS

BACKGROUND OF THE INVENTION

1. Field of the Invention

This invention relates to apparatus for reproducing signals from a record medium and, more particularly, to such apparatus which is capable of reproducing either digital or analog audio signals that are recorded on, for example, magnetic tape.

2. Description of the Prior Art

Conventional analog audio tape recorders are known wherein an analog signal is recorded in a longitudinal track on a magnetic tape driven past a stationary head that reproduces the analog signal. In conventional high fidelity audio equipment, two channels of audio signals normally are recorded to provide left (L) and right (R) stereophonic channels of audio information. Typically, the magnetic tape is housed in a cassette, such as the conventional compact cassette, wherein the tape may be driven first in one direction to reproduce one audio program comprised of left and right channels of audio information recorded on one "side" of the tape, and then in the opposite direction to reproduce another program of left and right channels of audio information recorded on the other "side".

In some cassette players operable with such cassettes, the two different directions of movement of magnetic tape are achieved simply by turning the cassette over to play a "different side" of the tape. Other cassette players include a so-called "auto-reverse" feature, whereby the tape is driven in one direction to reproduce signals from one "side" and then, when the tape reaches its end, or upon selection by the user, the tape transport direction is reversed such that signals recorded on the other "side" are played back. In actuality, the two "sides" of the tape comprise upper and lower longitudinal halves of one tape surface, the two halves respectively lying above and below the center line of the tape. Digital audio tape players also are known in which audio signals are recorded in digital form in separate longitudinal tracks, or channels of the tape. Recording or reproduction of these digital signals is achieved by using an individual head for each channel, whereby plural channels are recorded or reproduced substantially simultaneously. Like the analog audio cassette player, the digital audio cassette player, is capable of reproducing digital signals recorded in longitudinal tracks on two "sides" of the tape, i.e. in tracks on upper and lower halves of the tape.

In one type of digital tape player the tape must be turned over to permit the digital signals recorded on each "side" of the tape to be played back. In other digital tape players having the aforementioned "auto reverse" feature, the direction of movement of the tape merely is reversed to permit digital signals recorded on each "side" to be reproduced.

In both analog and digital tape players having the "auto reverse" feature, two sets of heads normally are provided: one set to reproduce analog or digital signals (as the case may be) from one half portion of the tape (e.g. from "side" A) when the tape is driven in the forward direction and another set of heads to reproduce analog or audio signals from the other half portion of the tape (e.g. from "side" B) when the tape is reversed. Of course, for analog and digital tape players that do not exhibit the "auto reverse" capability, only one set of heads need be provided.

Although separate analog audio signal reproducing apparatus and digital signal reproducing apparatus are known, it often is desirable to provide both analog and digital reproducing capabilities in a single machine. It had been thought that such dual analog and digital capability requires separate transducers (i.e. separate analog and digital heads) as well as separate and independently operable signal processing circuitry. Of course, the use of separate sets of heads and separate processing circuits is expensive, occupies substantial space, results in bulky equipment, and is complicated to assemble and use.

OBJECTS AND SUMMARY OF THE INVENTION

Therefore, it is an object of the present invention to provide apparatus for reproducing either digital audio signals or analog audio signals which is of relatively simple construction, does not occupy excessive space, is not expensive and is not complicated to use.

Another object of this invention is to provide apparatus of the aforementioned type wherein the same transducers, or heads, are used to reproduce either digital or analog audio signals from a record medium.

A further object of this invention is to provide apparatus of the aforementioned type wherein the signal processing circuitry which normally is used to process digital audio signals also is used to process analog audio signals which may be played back from a record medium.

Various other objects, advantages and features of the present invention will become readily apparent from the ensuing detailed description, and the novel features will be particularly pointed out in the appended claims.

In accordance with this invention, apparatus is provided for reproducing either M channels of digital audio signals recorded in several longitudinal tracks on a record medium or an analog audio signal recorded in at least one longitudinal track on a record medium. A plurality of heads reproduces the M channels of digital audio signals or the analog audio signals; and the reproduced audio signals are multiplexed. An analog-to-digital converter (ADC) digitizes the multiplexed audio signals which are supplied to a waveform equalizer. A processor sums the digitized audio signals produced by the ADC when an analog audio signal is reproduced by the heads and the summed signals are supplied to a digital filter which normally receives the output of a digital handling circuit that digitally processes the waveform equalized digitized audio signal when a digital audio signal is reproduced. The output of the digital filter is converted to analog form by a digital-to-analog converter.

In one embodiment, the heads comprise M magnetoresistive heads; and only N of those heads ($N \leq M$) are used to reproduce the analog audio signal. In this embodiment, the aforementioned processor is included in the waveform equalizer and includes a synchronous detector for detecting digitized samples produced by the ADC and a summing circuit coupled to the synchronous detector for summing N successive samples from the ADC. As one aspect, the summing circuit comprises an adder and an accumulator interconnected such that the contents of the accumulator are summed in the adder with a sample produced by the ADC and the summed signals are loaded into the accumulator to be summed with the next sample that is produced by the ADC.

In an alternate embodiment, the heads are formed as bulk-type magnetic heads, such as induction-type heads, at least one of which is displaced relative to the others in a longitudinal direction such that a relative time shift $\tau$ is imparted between the signals reproduced by the displaced heads and the signals reproduced by the other heads. In this embodiment, the processor includes a delay circuit for selectively delaying by a predetermined amount, such as $\tau$, the digitized samples from the ADC when analog audio signals are reproduced by the displaced heads. As one aspect of this embodiment, the processor comprises a storage circuit for storing the digitized analog audio samples produced at sampling intervals k, $(k-1)$, $(k-2)$, ... $(k-1-n)$, ...; and an accumulator for accumulating the sum of the digitized samples recovered from the other heads at the $(k-1)$th sampling interval and the digitized samples recovered from the displaced heads at the $(k-1-n)$th sampling interval.

BRIEF DESCRIPTIONS OF THE DRAWINGS

The following detailed description, given by way of example and not intended to limit the present invention solely thereto, will best be understood in conjunction with the accompanying drawings in which:

FIGS. 1A and 1B, in combination, illustrate a block diagram of one embodiment of the present invention;

FIGS. 4A–4J are timing diagrams which are useful in understanding the embodiment shown in FIGS. 1A and 1B;

Figure 5B:
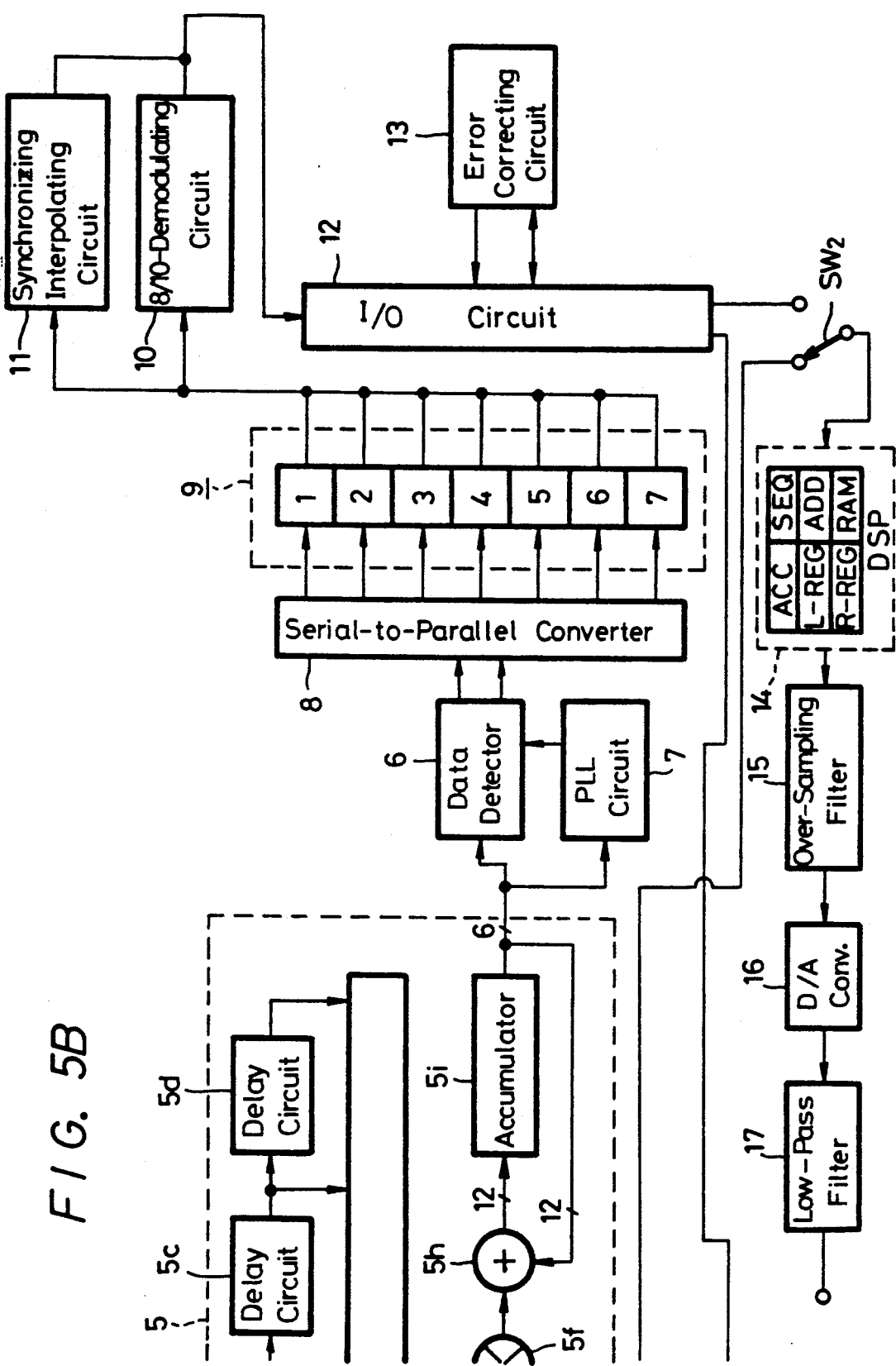
Figure 6:
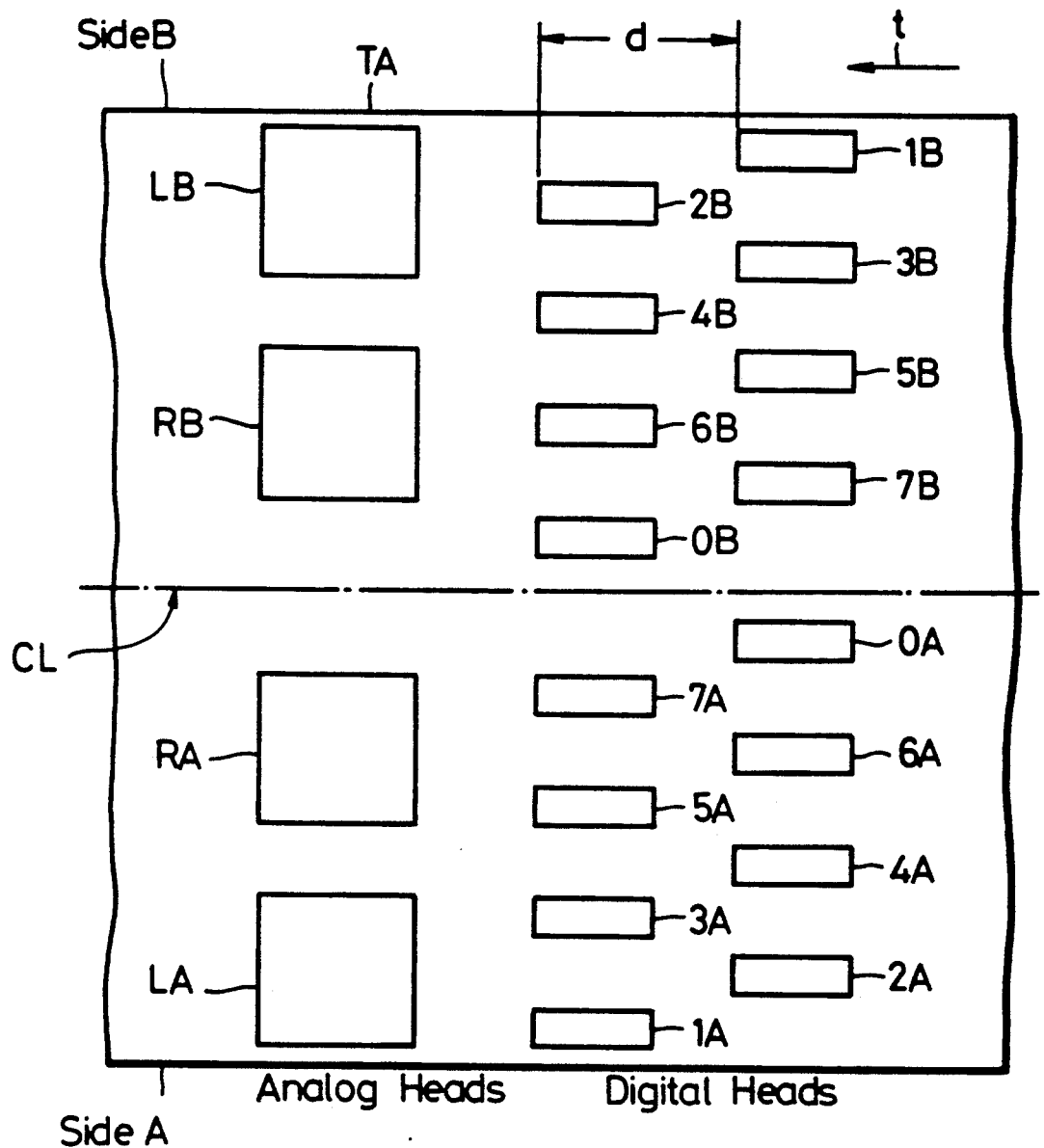
Figure 7:
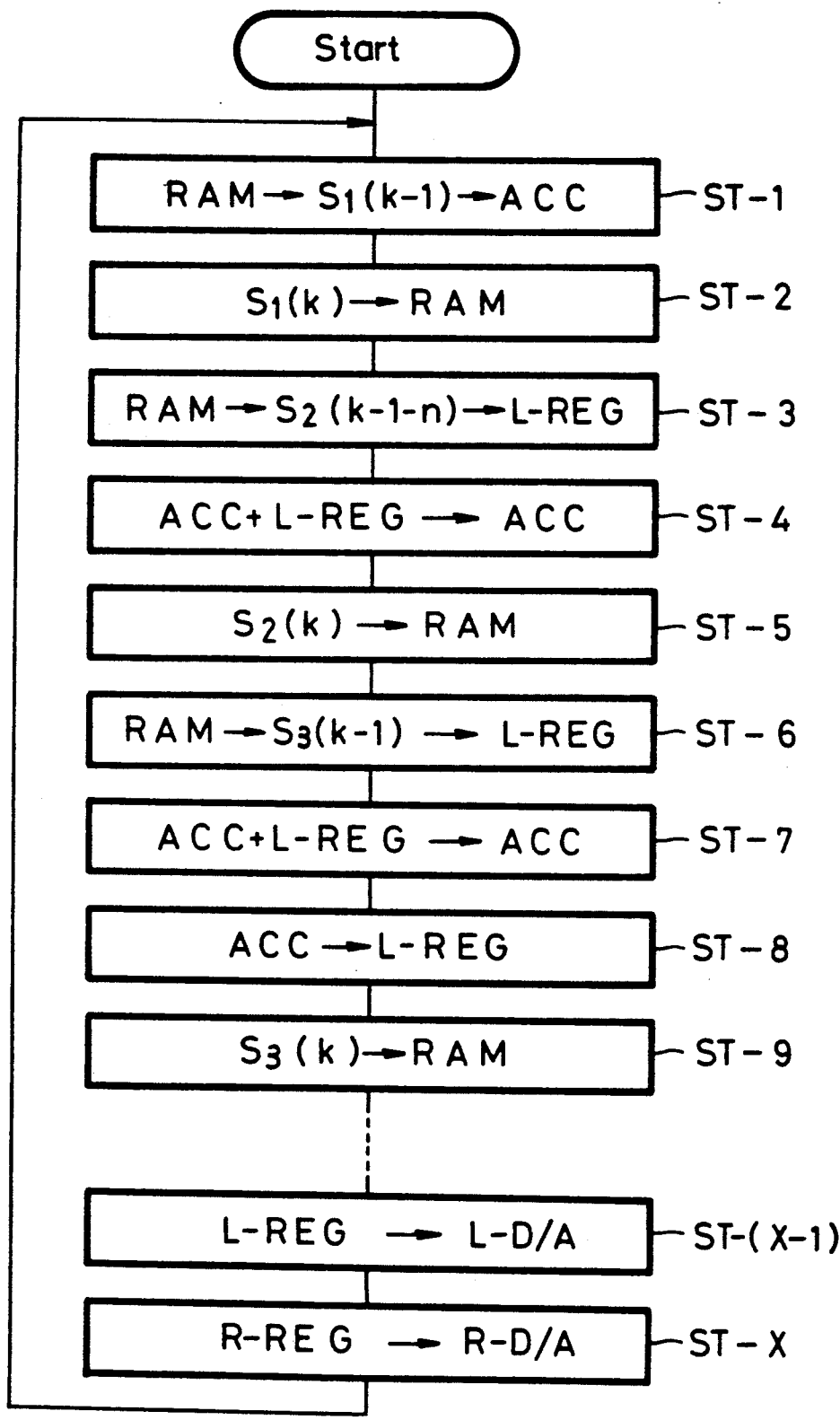
Figure 8:
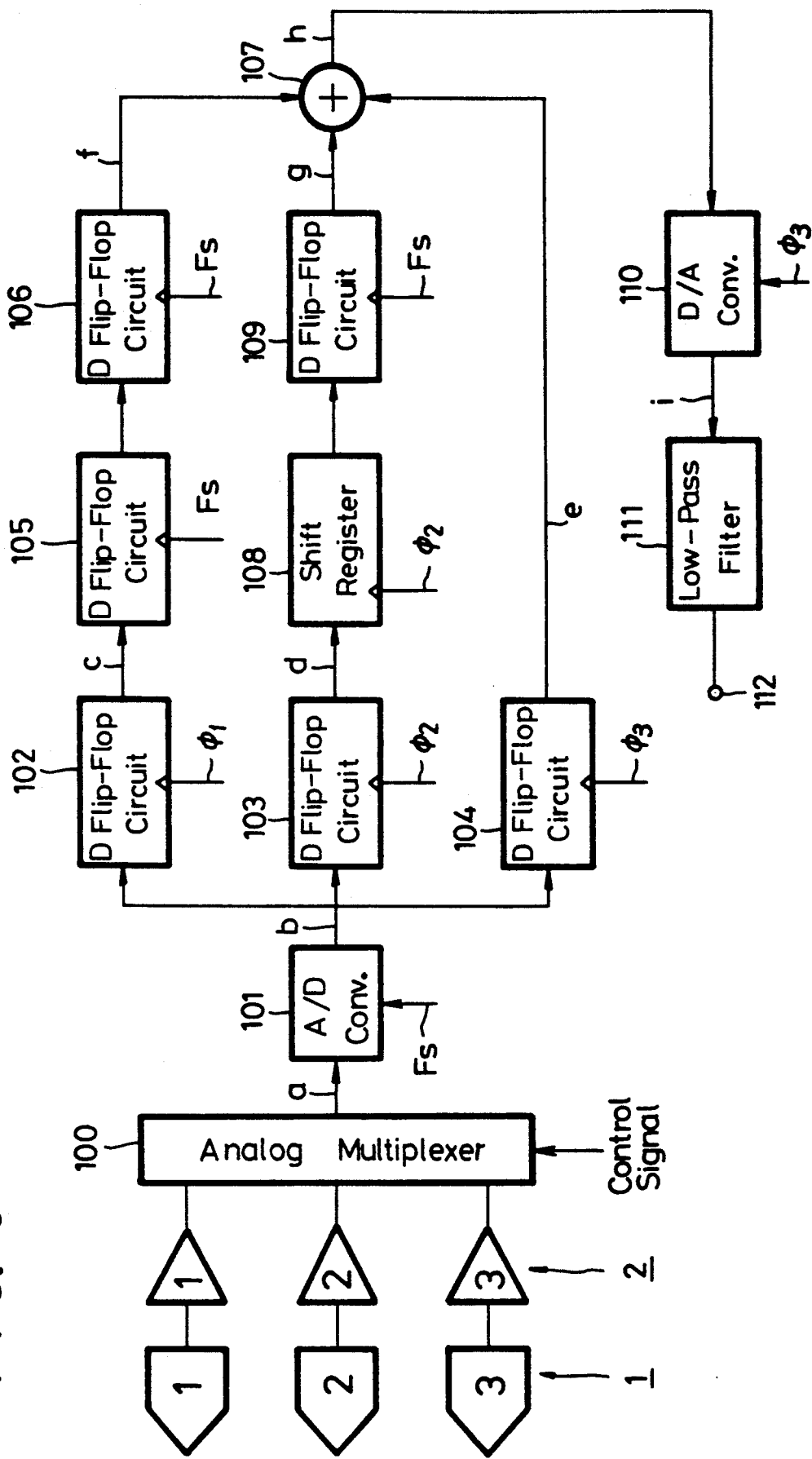
Figure 10:
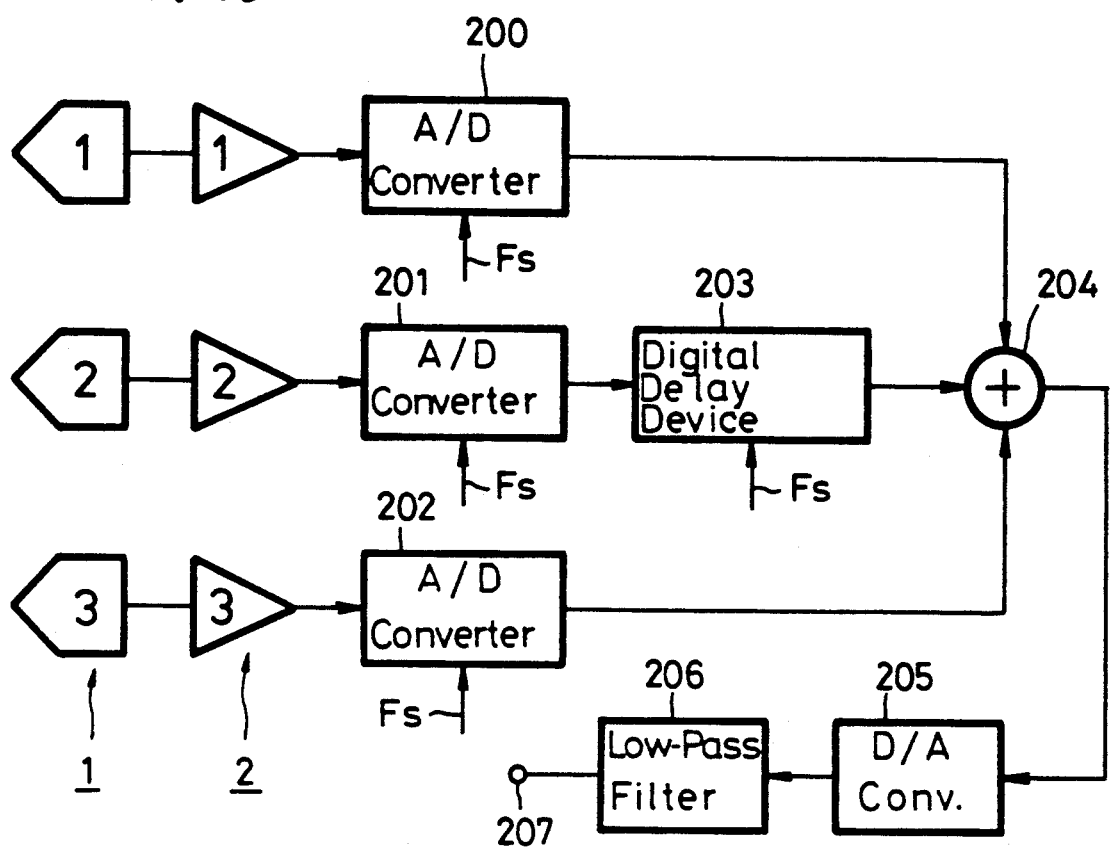
Figure 11:
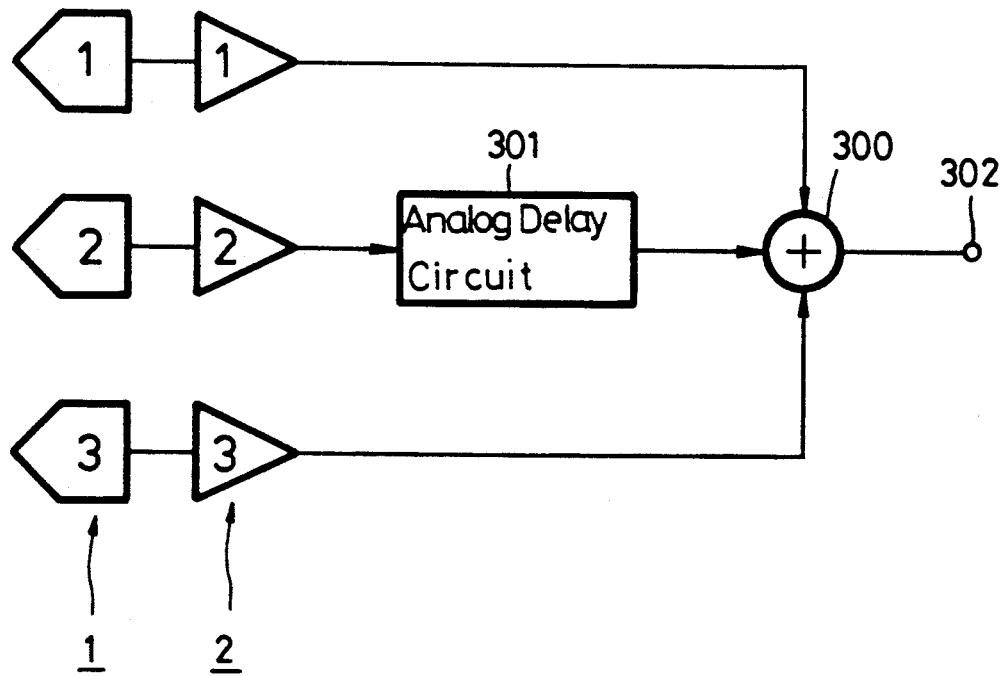

FIGS. 5A and 5B, in combination, illustrate a block diagram of another embodiment of the present invention;

FIG. 6 is a schematic representation of the heads which may be used to reproduce digital or audio signals in the embodiment of FIGS. 5A and 5B;

FIG. 7 is a flow chart which is useful in understanding the operation of the embodiment shown in FIGS. 5A and 5B;

FIG. 8 is a block diagram of yet another embodiment of the present invention;

FIGS. 9A–9M are timing diagrams which are useful in understanding the embodiment shown in FIG. 8;

FIGS. 10 and 11 are block diagrams of other arrangements which may be used to reproduce analog audio signals from a record medium;

FIG. 12 is a frequency characteristic vector diagram which is useful in understanding the advantages attained by the embodiment shown in FIGS. 5A and 5B; and FIG. 13 is a graphical representation of a frequency characteristic which also is useful in understanding the advantages achieved by the embodiment of FIGS. 5A and 5B.

DETAILED DESCRIPTION OF PREFERRED EMBODIMENTS

Figure 2:
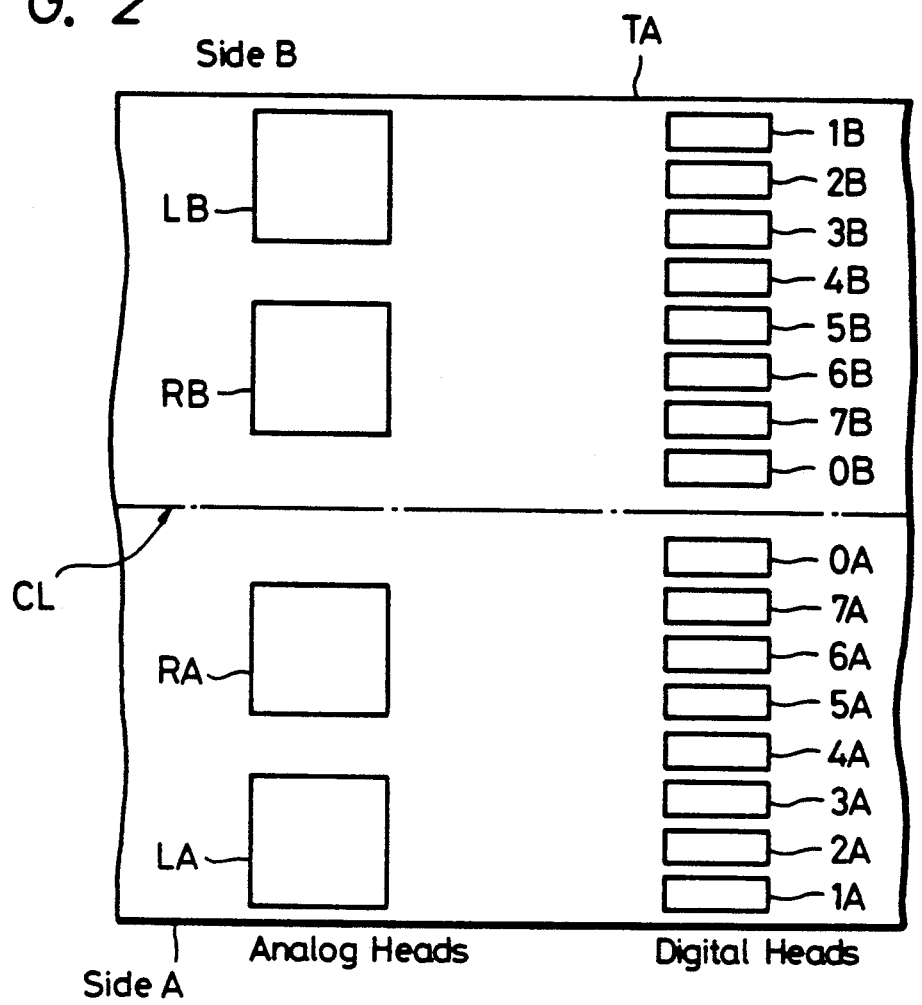
FIG. 2 is a schematic representation of one embodiment of an arrangement of heads which may be used with the invention shown in FIGS. 1A and 1B to reproduce digital or analog auido signals.

Before describing one embodiment of the present invention, reference is made to FIG. 2 which schematically illustrates a magnetic tape TA on which a digital audio signal or an analog audio signal may be recorded.

Assuming that tape TA conforms to the standards adopted for the compact cassette, the width of this tape is 3.81 mm and, when analog audio signals are recorded thereon, left-channel L and right-channel R analog audio signals are recorded in respective longitudinal tracks by conventional analog recording heads. As is standard, the recording heads are positioned such that the left-channel and the right-channel signals are recorded in respective tracks in one half portion of tape TA, such as portion A. More particularly, and as is shown in FIG. 2 analog heads LA and RA are positioned to record left-channel and right-channel analog signals respectively, on side A of tape TA. Side A is shown in FIG. 2 as the lower half portion of the tape relative to the center line CL thereof. It will be appreciated that, when the compact cassette in which tape TA is housed is turned over, heads LA and RA record left-channel and right-channel audio signals on side B. When side A is recorded, tape TA is transported in the left-to-right direction for the recording of left and right channel signals; and when the compact cassette is turned over, the tape may be thought of as now being driven in the right-to-left direction such that left and right channel signals are recorded on side B. Of course, to reproduce these left-channel and right-channel audio signals, heads LA and RA are used to play back the audio signals from side A and, when the tape is turned over, the audio signals are played back from side B.

If the recording apparatus with which tape TA is used exhibits the "auto reverse" feature, two sets of analog heads are used: one set comprised of heads LA and RA to record the aforementioned left and right channel audio signals on side A; and a mirror image representation comprised of heads LB and RB to record the left and right channel audio signals on side B. Audio signals are recorded on side A when tape TA is transported in the left-to-right direction and audio signals are recorded on side B when the tape is transported in the right-to-left direction. Of course, to reproduce the audio signals from sides A and B, if the reproducing apparatus is capable of operating in the auto reverse mode, the audio signals recorded on side A are reproduced when tape TA is transported in the left-to-right direction and the audio signals recorded on side B are reproduced when the tape is transported in the right-to-left direction, thus requiring two sets of playback heads. Alternatively, the reproducing apparatus may be provided with but a single set of heads LA and RA, thus requiring tape TA to be turned over to reproduce the audio signals from side B. Consistent with the standards adopted for recording analog audio signals on a compact cassette, heads RA and RB are located closer to the center line CL than are heads LA and LB.

As an alternative to having analog audio signals recorded on respective tracks on sides A and B of magnetic tape, tape TA may have digital audio signals recorded thereon. In one conventional technique, stereophonic digital audio signals, comprised of left-channel and right-channel information, are recorded in multiple channels, or tracks, such as in M tracks, by M heads. For digital recording/playback apparatus exhibiting auto reverse capability, two sets of M heads may be provided, one set disposed on one side of center line CL to record or reproduce digital audio signals on side A of tape TA, and the other set disposed on the opposite side of center line CL to record or reproduce digital audio signals on side B. If the recording/playback apparatus is not capable of operating in an auto reverse mode, only one set of heads need be provided, and signals may be recorded on both sides A and B simply by turning the tape over.

FIG. 2 illustrates a set of eight magnetic heads (M=8) 1A, 2A, 3A, ... 7A, 0A for recording eight channels of digital audio signals on side A. In the absence of auto reverse capability, these same heads 1A-7A, 0A are used to record/reproduce digital audio signals from side B simply by turning tape TA over. FIG. 2 illustrates another set of eight heads 1B, 2B, 3B, ... 7B, 0B capable of recording/reproducing digital audio signals from side B when tape TA is transported in the reverse direction.

Typically, analog recording/playback apparatus is not capable of recording or reproducing digital audio signals and, similarly, digital recording/playback apparatus is not capable of recording analog audio signals. To provide dual capabilities in the same device, analog recording/playback heads and digital recording/playback heads heretofore have been required. Thus, and with reference to FIG. 2, heads LA and RA (as well as heads LB and RB) would be used to record or reproduce analog audio signals only; and heads 1A-0A (as well as heads 1B-0B) would be used to record or reproduce digital audio signals only. If the analog audio signals are stereophonic signals, they are recorded in two tracks on one side of tape TA, and if the audio signals are monophonic signals, they are recorded in only one track. Stereophonic digital audio signals are recorded in M tracks on one side of tape TA and, in one conventional recording technique, the digital audio signals are comprised of audio information recorded by heads 1A-7A (as well as by heads 1B-7B) and cue signals recorded by head 0A (as well as by head 0B). The cue signals relate to the location of various audio programs for quick access, such as by fast forward operation, and also may be used to perform other functions known to those of ordinary skill in the art. Such cue signals are useful in reproducing the digital audio information and, thus, for the purpose of the present discussion, head 0A (and head 0B) may be thought of as being used with heads 1A-7A (and with heads 1B-7B) to record digital audio signals. Typically, left and right stereophonic audio channels are converted into digital audio signals of reduced bit rate, are interleaved and are recorded in parallel longitudinal tracks by heads 1A-7A (and by heads 1B-7B).

In accordance with the present invention, the heads normally used to reproduce digital audio signals are used to reproduce analog audio signals that may have been recorded on a separate device by analog recording heads LA and RA (or by heads LB and RB). A comparison of the alignment of the analog heads with the digital heads in FIG. 2 indicates that, when analog audio signals are recorded by, for example, head LA, digital heads 1A, 2A and 3A reproduce respective portions, or sub-channels, of the analog audio signal. Likewise, when analog audio signals are recorded by head RA, heads 5A, 6A and 7A reproduce respective sub-channels of that analog signal. Digital head 4A is aligned between the tracks of analog audio signals and, thus, is assumed not to reproduce useful information. Similarly, head 0A is aligned between the center line CL of tape TA and the track of analog audio signals recorded by analog head RA and, therefore, it too is assumed not to reproduce useful analog information. In similar manner, if two sets of digital heads are provided, heads 1B, 2B and 3B are adapted to reproduce individual sub-channels of the left channel audio signal recorded by analog head LB, and digital heads 5B, 6B and 7B are adapted to reproduce individual sub-channels of the right channel audio signal recorded by head RB. Here too, heads 4B and 0B are assumed not to reproduce useful analog information. Thus, of the M heads used for digital audio signal reproduction, N of those heads (N<M) are used to reproduce analog audio signals. In the illustrated embodiment, M=8 and N=6, although in general, $2 \leq N \leq M$.

Figure 1B:
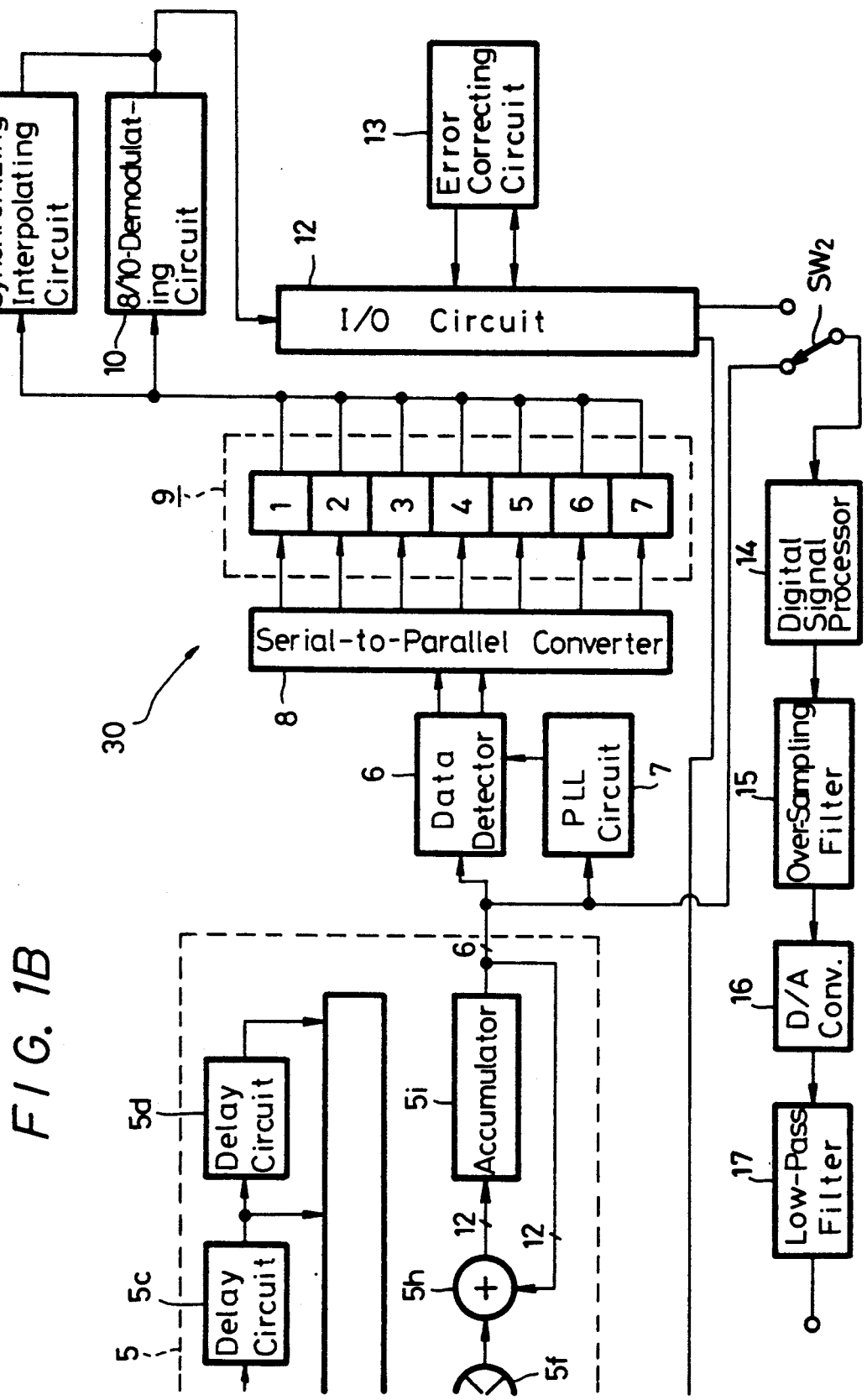

The manner in which signals are reproduced from tape TA by heads 1A-7A an 0A and by heads 1B-7B and 0B in accordance with the present invention now will be discussed in conjunction with the block diagrams shown in FIGS. 1A and 1B. It is assumed that the digital heads 1A-7A, 0A and heads 1B-7B, 0B are constructed as magnetoresistive heads. These heads are sufficiently small as to be aligned transversely of the longitudinal axis of tape TA. As is conventional, to reproduce digital signals, the magnetoresistive heads are supplied with a DC bias current which, as shown in FIG. 1A, is coupled to the magnetoresistive heads from a source 19 by a suitable switch $SW_3$. This switch is illustrated schematically as an electromechanical switch, but it will be appreciated that switch $SW_3$ comprises a conventional solid-state switching element.

Although not shown in detail in FIG. 1A, those of ordinary skill in the art will appreciate that each magnetoresistive head is comprised of a magnetoresistive sensing portion and a bias portion which applies a bias magnetic field to the sensing portion. The DC bias current produced by source 19 is supplied to the bias conductor which applies a bias magnetic field to the sensing portion of the magnetoresistive head. When this sensing portion detects a changing magnetic field, as from signals recorded on magnetic tape TA, its resistance value changes proportionally thereto; and this change in resistance value is detected to produce a signal representing the recorded signal. As will be described, when digital audio signals are reproduced from the tape, the bias conductor included in the magnetoresistive head is supplied with the DC bias current produced by DC bias current generator 19. However, when an analog audio signal is recovered from the tape, the bias conductor included in the magnetoresistive head is supplied with an AC clock signal produced by an AC bias clock generator 20 which is coupled to the magnetoresistive heads by switch $SW_3$ and the AC bias current is supplied to the magnetoresistive sensing portion. Accordingly, when digital audio signals are to be reproduced by the apparatus illustrated in FIGS. 1A and 1B, switch $SW_3$ couples DC bias current generator 19 to the magnetoresistive heads; and when analog audio signals are to be reproduced, switch $SW_3$ is operated to couple to the bias portion of the magnetoresistive heads the AC bias clock signal produced by AC bias clock generator 20.

The signal reproducing apparatus is comprised of a multiplexer 3, an analog-to-digital converter (ADC) 4, a waveform equalizer 5, digital handling circuitry 30 (FIG. 1B), a digital signal processor 14, an oversampling filter 15 and a digital-to-analog converter (DAC) 16. Multiplexer 3 comprises an analog multiplexer having a plurality of inputs coupled to heads 1A-7A (or to heads 1B-7B) by amplifiers $2_1, 2_2, 2_3, \ldots 2_7$, respectively. The analog multiplexer is adapted to multiplex the sub-channel signals supplied thereto from the digital heads in time division multiplexed form so as to provided a serial signal. It is appreciated that, when digital signals are recorded on magnetic tape, the signals reproduced by the digital heads do not exhibit pure digital form. Rather than exhibiting square or rectangular waveforms, the reproduced signals exhibit analog wave shapes; and these analog wave shapes are multiplexed in time division serial form by multiplexer 3. Thus, whether digital signals having analog waveforms are reproduced by the digital heads or analog signals are reproduced thereby, multiplexer 3 functions to provide a serial analog signal corresponding to the reproduced analog wave shapes reproduced from the respective digital channels or analog sub-channels by the heads.

Multiplexer 3 is coupled to ADC 4 which is supplied with a sampling clock signal of frequency $F_s$. The ADC samples the serial signal produced by multiplexer 3 to provide a multi-bit digital representation of each sample. When the illustrated apparatus is used to reproduce digital audio signals, ADC 4 functions as a wave shaper and serial-to-parallel converter for the digital signals which are reproduced with analog wave shapes. Of course, when analog audio signals are reproduced by the digital heads, ADC 4 serves to sample the multiplexed sub-channel signals recovered from individual heads and to digitize each sample.

The digital audio signals which are reproduced by the illustrated apparatus normally are recorded in a time compressed mode, whereby original audio signals are digitized by a 16-bit linear quantization process, time compressed by a factor of ¼, interleaved and recorded on seven parallel tracks. As is typical, to record an original analog audio signal in digital form, the analog signal is sampled at a frequency $f'_s$ that is at least twice the maximum frequency included in the analog signal. Hence, the sampling frequency $f'_s$ may be on the order of about 32 kHz, 44.1 kHz, 48 kHz or other conventional sampling frequencies. Accordingly, to be compatible with the sampling frequency used for recording, the frequency $F_s$ of the clock signal supplied to ADC 4 for sampling the multiplexed signals recovered from the playback heads may be expressed as $F_s = 8f'_s$.

Waveform equalizer 5 is coupled to ADC 4 and is adapted to receive a parallel 8-bit digital signal from the ADC. The waveform equalizer functions as a digital filter, such as a finite impulse response filter. Waveform equalizer 5 serves to correct amplitude variations in the magnetically recorded signal due to the digital pattern that may be recorded.

To best appreciate the function of waveform equalizer 5, let it be assumed that the magnetic recording/reproducing system comprised of a magnetic recording head, magnetic tape and a magnetic playback head exhibits a transfer function $H(\omega)$ wherein:

$$H(\omega) = \exp(-a|\omega|)$$

In accordance with this transfer function, the output signal level exponentially decreases as the frequency of the signal increases. If the digital signal is recorded as a non-return to zero (NRZ) pulse, the output waveform reproduced by the magnetic head appears sinusoidal having a relatively large level when a continuous "1" or "0" is recorded; but the level of this sinusoidal wave is relatively low when the recorded digital signal is comprised of alternating "1" and "0". Waveform equalizer 5 operates to increase the level of the sinusoidal wave in the event that alternating 1's and 0's are reproduced, whereby the original digital signal, such as a square wave, may be recovered accurately from the output of the playback head.

In one embodiment, waveform equalizer 5 is comprised of a series of cascaded delay circuits 5a, 5b, 5c and 5d, each delay circuit being formed as an 8-bit shift register having sixteen stages. Thus, if the clock signal $F_s$ is supplied to the delay circuits, each delay circuit imparts a time delay on the order of $16T_s$ wherein $T_s = 1/F_s$. The outputs of delay circuits 5a-5d, as well as the output of ADC 4, are coupled to a data selector 5e which functions to select a desired time delay by coupling one of the delay circuit outputs therethrough. If $T = 16T_s$, then data selector 5e is adapted to selectively delay the digitized samples produced by ADC 4 by $0 \times T$, $1 \times T$, $2 \times T$, $3 \times T$ or $4 \times T$.

The output of data selector 5e, that is, the selectively delayed 8-bit digitized sample produced by ADC 4, is coupled to a multiplier 5f which is adapted to multiply the digitized sample with a predetermined coefficient. In this regard, a digital coefficient generator 5g is selectively coupled to another input of multiplier 5f by a switch $SW_1$. This switch $SW_1$ is ganged for simultaneous operation with aforementioned switch $SW_3$ such that, when the playback heads reproduce a digital audio signal, switch $SW_1$ couples digital coefficient generator 5g to multiplier 5f, but when an analog audio signal is reproduced, switch $SW_1$ couples AC bias clock generator 20 to the multiplier. Digital coefficient generator 5g supplies a parallel 8-bit signal representing a predetermined coefficient that corresponds to the particular delay selected by data selector 5e. Thus, the coefficient with which the selectively delayed digitized sample is multiplied is itself a function of that selected delay.

The output of multiplier 5f is coupled to a summing circuit comprised of an adder 5h and an accumulator 5i. The output of the adder is coupled to the accumulator which, in turn, has an output that is fed back to the adder to be summed with the output of multiplier 5f. Accordingly, the contents of the accumulator, which are represented as a 12-bit parallel signal, are summed with the output of multiplier 5f to produce a parallel 12-bit summed signal that is loaded into the accumulator to be summed subsequently with the next product produced by the multiplier.

The output of accumulator 5i is used as the output of waveform equalizer 5; and in one embodiment, the six most significant bits of the 12-bit signal stored in the accumulator are provided as the waveform equalized output signal. The output of the waveform equalizer is coupled to digital handling circuit 30 which provides a digitally processed, waveform equalized, digitized audio signal to digital signal processor 14. More particularly, a switch $SW_2$, which may be ganged with switches $SW_1$ and $SW_3$, couples the output of digital handling circuit 30 to digital signal processor 14 when the illustrated apparatus is used to reproduce digital audio signals; and this switch is operated to couple the output of waveform equalizer 5 to the digital signal processor when analog audio signals are reproduced by the playback heads.

Digital handling circuit 30 is comprised of a data detector 6 supplied with a clock signal generated by a phase locked loop (PLL) circuit 7, the latter being coupled to the output of the waveform equalizer to extract a clock signal from the waveform equalized digitized audio signal supplied thereto. In response to the extracted clock signal, data detector 6 recovers a time division frequency multiplexed digital audio signal corresponding to the digital audio signal reproduced from the parallel tracks by heads 1A-7A. One embodiment of data detector 6 and PLL circuit 7 may be of the type described in Japanese Laid-Open Application No. 59-92410.

The time division multiplexed signal recovered by data detector 6 is supplied to a serial-parallel converter 8 wherein the serial-bit signal is reconverted into the original 7-channel digital audio signal reproduced by heads 1A-7A (or by heads 1B-7B). The recovered seven-channel digital audio signals are supplied to a synchronizing separating circuit 9 to separate a synchronizing signal therefrom. The seven-channel digital audio signals then are coupled to an eight-to-ten (8/10) demodulator 10 and to a synchronizing interpolating circuit 11, from which the demodulated seven-channel digital audio signals are supplied to an input/output (I/O) circuit 12. An error correcting circuit 13 is coupled to I/O circuit 12 to perform an error correcting operation, if necessary. Error correction of digital signals is known to those of ordinary skill in the art and further description thereof is not provided.

The purpose of the 8/10 demodulator is to recover 8-bit data from 10-bit data that normally is recorded. Although not shown herein, it will be appreciated that, during a digital audio signal recording operation, 8-bit digital samples of the audio signal are converted to ten bits for recording; and demodulator functions to reconvert the recorded 10-bit signals to 8-bit format.

A system controller 18, shown in FIG. 1A, is supplied with the cue signal normally reproduced by head 0A (or head 0B) and also with a control signal from I/O circuit 12. The system controller, which forms no part of the present invention per se, functions to supply control signals to respective portions of the reproducing apparatus.

Digital signal processor 14, which is selectively coupled to I/O circuit 12 by switch $SW_2$, functions to demodulate the seven-channel digital signals in accordance with the bit rate reduction used for recording. The digital signal processor includes a programmable sequence, accumulator and random access memory described further below in conjunction with FIGS. 5A and 5B. The output of the digital signal processor is coupled to oversampling filter 15, thereby supplying to the filter either the summed digitized audio signals provided at the output of accumulator $5i$ when analog audio signals are reproduced by the playback heads, or the digitally processed audio signals supplied by digital handling circuit 30 when digital audio signals are reproduced by the heads. The combination of digital signal processor 14 and oversampling filter 15 serves to attenuate an aliasing noise component. The filtered digital signal produced by filter 15 is converted to analog form by DAC 16 and the converted analog signal then is filtered by a low pass filter 17 to recover analog audio signals. Thus, whether digital or analog audio signals are reproduced by the playback heads, low pass filter 17 produces an analog audio signal which may be converted to audible sound. Filter 17 also functions to remove a final aliasing noise component, thus producing left-channel and right-channel stereophonic audio signals.

Figure 3:
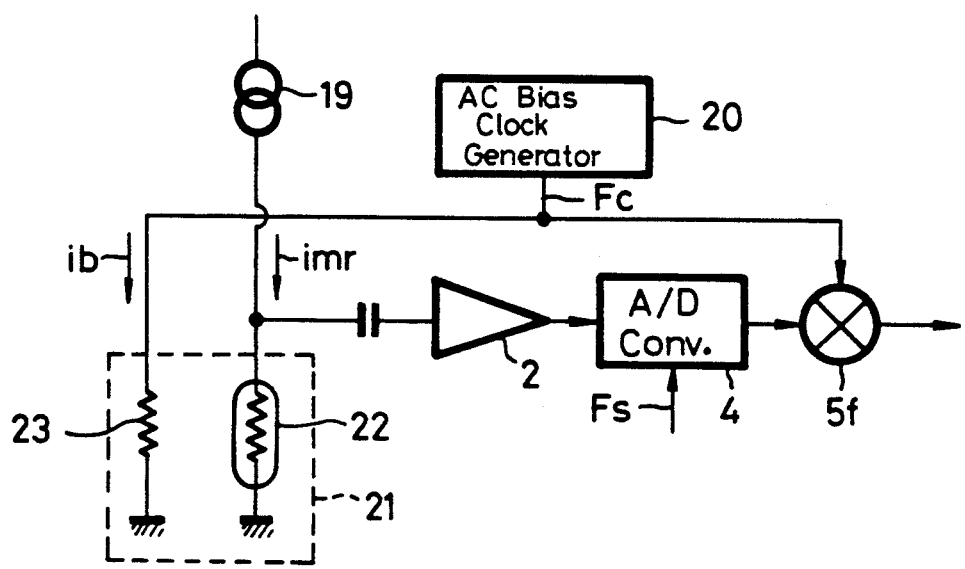
FIG. 3 is an equivalent block diagram of a portion of FIGS. 1A and 1B used to reproduce analog audio signals.

In accordance with the present invention, the circuitry normally used to recover and process digital audio signals is used to recover and process analog audio signals. In particular, the manner in which multiplier $5f$ in waveform equalizer 5 is used to process analog audio signals is best illustrated in FIG. 3. Here, a magnetoresistive head 21 is shown with its sensing portion 22 and bias conductor 23. When connected to recover analog audio signals, AC bias clock generator 20 is coupled by switch $SW_3$ to bias conductor 23; and sensing portion 22 is supplied with a constant bias current from DC bias current generator 19. As mentioned above, the DC bias current produced by generator 19 is supplied to sensing portion 22 when both digital and analog audio signals are reproduced. However, bias conductor 23 is supplied with the DC bias current when digital audio signals are played back and with the AC bias clock when analog audio signals are played back. The output of sensing portion 22 is coupled through an amplifier 2 and multiplexer 3 (not shown in FIG. 3) to ADC 4, whereat the recovered, multiplexed analog signal is digitized. Multiplier $5f$ is supplied with the AC bias clock by switch $SW_1$ when analog audio signals are reproduced; and the AC bias clock functions to synchronously detect the digitized samples.

The manner in which the apparatus shown in FIGS. 1A and 1B reproduces analog audio signals now will be described with reference to the waveform diagrams of FIGS. 4A-4J. FIG. 4A illustrates the sampling clock of frequency $F_s$ having a period $T_s$ supplied to ADC 4. FIG. 4B schematically represents the successive time division multiplexed samples produced by multiplexer 3 in response to the control signal supplied thereto so as to serialize the analog signals reproduced from the sub-channels by heads 1A-7A and 0A (as well as by heads 1B-7B and 0B). It is seen that the frequency of the multiplex control signal is equal to the sampling clock frequency $F_s$ such that, during each sampling clock period, the signal produced by a respective one of the playback heads from a sub-channel is coupled through the multiplexer to ADC 4.

FIG. 4C represents the output derived from multiplexer 3. Assuming that the control signal supplied thereto exhibits repetitive intervals 0, 1, 2, ... 6, 7, 0, 1, ... and so on, it is seen from FIG. 4C that, since the output from head 0A (or head 0B) is not supplied to the multiplexer, the output of the multiplexer at sample time 0 (which corresponds to the output from this head) may be thought of as being "idle". At sample times 1, 2 and 3, the multiplexer supplies analog outputs from the sub-channels reproduced by heads 1A, 2A and 3A, respectively. At sample time 4, the multiplexer supplies the output reproduced by head 4A; but from FIG. 2, it is seen that head 4A is aligned between the left-channel and right-channel analog tracks. Hence, the information produced from head 4A may be thought of as noise.

At sample times 5, 6 and 7, multiplexer 3 supplies the analog outputs from the sub-channels reproduced by heads 5A, 6A and 7A, respectively. Then, the foregoing multiplexing process repeats.

From FIG. 2, it is recognized that heads 1A, 2A and 3A reproduce analog signals included in the left-channel; and heads 5A, 6A and 7A reproduce analog signals included in the right-channel. FIG. 4C conforms to this notation and indicates that the analog signals produced by the multiplexer during sample times 1, 2 and 3 are derived from the left-channel; and the analog signals produced during sample times 5, 6 and 7 are included in the right-channel. For convenience, FIG. 4C illustrates the left-channel and right-channel signals produced by the multiplexer during 0-th sampling interval, followed by the signals produced during the 1st sampling interval, followed by the signals produced during the 2d sampling interval, and so on. These sampling intervals are defined by each half cycle of the AC bias clock signal shown in FIG. 4D. A comparison of FIG. 4D with FIGS. 4A, 4B and 4C indicates that the AC bias clock period $T_c = 16\ T_s$ and the sampling frequency $F_s = 16\ F_c$.

Although FIG. 4C has been described in conjunction with the multiplexed signals reproduced by heads 1A-7A, it will be appreciated that the very same description applies if the multiplexed signals are derived from heads 1B-7B.

The AC bias clock signal shown in FIG. 4D is supplied to multiplier 5f whereat it is multiplied with the digitized multiplexed samples produced by ADC 4 from the samples supplied by multiplexer 3. As a result, the digitized multiplexed samples are synchronously detected and may be represented as shown in FIG. 4E. FIG. 4E is similar to FIG. 4C, except that the respective sampling intervals noted as 0th, 1st, 2d, and so on in FIG. 4C are not similarly designated in FIG. 4E.

FIG. 4F illustrates the output of adder 5h when the synchronously detected digitized multiplexed samples from ADC 4 are summed with the contents of accumulator 5i. Initially, it is assumed that the contents of the accumulator are equivalent to zero. Thus, as shown in FIG. 4F, the first digitized sample recovered by head 1A and supplied by multiplier 5f is summed with the zero contents of accumulator 5i, and at the next clock pulse this sum is loaded into the accumulator to be fed back and summed with the next digitized sample. Assuming that this first digitized sample is represented as 1, and consistent with the assumption that the initial contents of accumulator 5i are represented as 0, adder 5h produces the sum: $1+0=1$. This sum is stored in accumulator 5i.

Then, when the next digitized sample 2 recovered from head 2A is provided at the output of the multiplier, it is summed with the present contents of accumulator 5i, producing the sum: $2+1$. This sum is loaded into the accumulator at the next clock pulse for summing with the next digitized sample presented to the adder.

From FIG. 4E, it is seen that the next sample supplied to adder 5h by ADC 4 is sample 3 recovered by head 3A. When this sample is summed with the present contents of the accumulator, the resultant is represented as the sum: $3+2+1$ (see FIG. 4F). This sum is loaded into the accumulator at the next clock pulse to be summed with the next sample supplied to the adder from the ADC.

FIG. 4G is a timing diagram representing the contents of the accumulator. The contents are updated at the clock rate $F_s$ to store temporarily the sum produced by adder 5h. FIG. 4G illustrates that the output of adder 5h is loaded into the accumulator at the next sample time following the production of the sum, that is, when the next sample produced by ADC 4 is supplied to the adder.

From FIGS. 4C and 4E, it is seen that adder 5h first is supplied with three samples from respective sub-channels of the audio signal recorded in the left-channel track on tape TA, followed by three samples from respective sub-channels of the audio signal recorded in the right-channel track on the tape. It is appreciated that the left-channel information generally is not related to the right-channel information. Accordingly, the contents of the accumulator should be cleared after all of the samples from the sub-channels of the left-channel audio signal have been summed so that such samples are not summed with the sub-channel samples derived from the right-channel audio signal. FIG. 4H illustrates a clear, or reset, signal which may be derived from the AC bias clock shown in FIG. 4D, this clear signal being generated at every fourth sampling clock time so as to erase the contents of the accumulator before digitized audio signals derived from the next channel first are presented. FIG. 4G illustrates the contents of the accumulator from sample time to sample time, and particularly represents the clearing of the accumulator in response to the clear signal shown in FIG. 4H.

The contents of accumulator 5i are supplied to digital signal processor 14 by switch SW$_2$. The digital signal processor includes a storage circuit, such as an accumulator or a latch circuit for storing the contents of accumulator 5i just prior to the aforementioned resetting thereof. FIG. 4I illustrates the data which is stored in this latch circuit; and it is appreciated that when the sum $3+2+1$ is loaded into the accumulator for the left-channel sampling interval L-0, this sum is stored in the latch circuit.

The foregoing operation of adder 5h and accumulator 5i for the digitized sub-channel samples derived from the track of right-channel audio signals is substantially the same as that described above. For the right-channel sampling interval R-0, if multiplexed digitized samples thereof are identified as samples 5, 6 and 7 (recovered by heads 5A, 6A, 7A) as shown in FIG. 4E, the output of adder 5h is as shown in FIG. 4F. It is appreciated that, when sample 5 is present, the contents of accumulator 5i will have been reset; and, therefore, sample 5 is summed with 0 resulting in the sum: 5. When next-following sample 6 is supplied to the adder, the accumulator contains the sum 5, and these contents are summed with sample 6 resulting in the sum: $6+5$. At the next clock pulse just prior to the arrival of the next sample 7, the sum $6+5$ is loaded into the accumulator. When sample 7 is supplied to adder 5h, the contents $6+5$ of the accumulator are fed back to the adder and summed with sample 7, resulting in the sum: $7+6+5$. At the next clock pulse, this sum is stored in the accumulator and then is latched in the latch circuit of digital signal processor 14. The accumulator then is cleared.

As the foregoing operation continues, the latch circuit included in digital signal processor 14 stores the summed sub-channel samples which, in successive sampling intervals, comprise alternating left-channel and right-channel sampling intervals L-0, R-0, L-1, R-1, L-2, R-2, and so on, as illustrated in FIG. 4I. It is appreciated that the summed samples for each left-channel and right-channel sampling interval constitute a digital reconstruction of the sub-channel analog samples produced by multiplexer 3 from the left-channel and right-channel analog audio signals that are recovered by heads 1A-3A and 5A-7A (or 1B-3B and 5B-7B). After being stored in the latch circuit of the digital signal processor, the digital representations of the reproduced analog audio signals are read out, as shown in FIG. 4J, to be filtered by oversampling filter 15 and converted to analog form by DAC 16. The resultant left-channel and right-channel analog audio signals provided at the output of DAC 16 is filtered by low pass filter 17 and made available for further processing, such as sound reproduction, further recording, signal transmission, or the like.

It is appreciated from the foregoing discussion that the circuitry shown in FIGS. 1A and 1B is used to process either digital audio signals or analog audio signals which may be reproduced by the digital heads of the type shown in FIG. 2. The circuitry which normally processes the reproduced digital audio signal serves to reduce the aliasing noise that may be present in the sub-channels of the analog audio signal which are reproduced by the digital heads. It is appreciated that the summation of the digitized sub-channel signals represents the originally recorded left-channel or right-channel analog audio signal.

Another embodiment of the present invention is illustrated in the block diagram comprised of FIGS. 5A and 5B. In this embodiment, the magnetic heads which are used to reproduce digital or analog audio signals differ from the magnetoresistive heads that are used in the aforedescribed embodiment. In particular, in this embodiment, rather than using magnetoresistive heads, so-called "bulk-type" heads, such as induction-type magnetic heads, are used. These bulk-type magnetic heads are somewhat larger than the aforedescribed magnetoresistive heads and, thus, one complete set of heads is not aligned transversely of the longitudinal direction of the tape. Rather, alternate ones of these bulk-type heads are staggered, or longitudinally displaced from each other, in the manner shown in FIG. 6.

As was the case for the arrangement of heads shown in FIG. 2, those heads with the suffix "A" are used to reproduce signals recorded on side A and, if the reproducing apparatus exhibits auto reverse capability, those heads identified with the suffix "B" are used to reproduce signals from side B. In the absence of an auto reverse mode, the "A" heads are used to reproduce signals recorded on side A and, when the tape is turned over, to reproduce those signals recorded on side B. FIG. 6 also illustrates the relative positioning of the digital heads 1A–7A and 0A (and 1B–7B and 0B) relative to the tracks in which the left-channel and right-channel analog audio signals are recorded by analog heads. As before, heads 1A, 2A and 3A are positioned to reproduce the left-channel analog audio signals and heads 5A, 6A and 7A are positioned to reproduce the right-channel analog audio signals. These digital heads are, of course, adapted to reproduce M channels of digital audio signals as well. As in the previous embodiment, $N \leq M$ and, as one example, $M=8$ and $N=6$.

Assuming that successive heads are longitudinally displaced from each other by the distance d, for example, assuming that the odd-numbered heads are displaced by the distance d from the even-numbered heads, and further assuming that tape TA is transported in the direction shown in FIG. 6 at a transport speed of v, then at any given time, the signals reproduced from side A by the odd-numbered heads are delayed relative to the signals reproduced by the even-numbered heads by the delay time $\tau$. When analog audio signals are reproduced by the digital heads, sub-channels of the left-channel analog audio signals are reproduced by heads 1A, 2A and 3A and sub-channels of the right-channel analog audio signals are reproduced by heads 5A, 6A and 7A. Assuming that the analog audio signals reproduced by heads 1A and 3A are represented as F(t), wherein t represents time, the analog audio signal reproduced by head 2A may be expressed as $F(t+\tau)$. If each head is assumed to reproduce a sub-channel of the left-channel (or right-channel) analog audio signal, then the left-channel audio signal (as an example) may be represented by the sum of the sub-channel signals reproduced by heads 1A–3A. If the sum of these signals is represented as S(t), then:

$$S(t) = 2F(t) + F(t+\tau)$$

The frequency characteristic of this summed signal S(t) may be expressed as follows:

$$|S(\omega)|/F(\omega)| = |[2F(\omega) + F(\omega) \exp(+j\omega\tau)]/F(\omega)| = |2 + \exp(+j\omega\tau)|$$

A vector representation of this frequency characteristic of the summed sub-channels is illustrated in FIG. 12. The frequency characteristic itself is graphically depicted in FIG. 13. As shown in FIG. 13, a dip, or minimum magnitude, occurs at those frequencies f wherein $f = \frac{1}{2}\tau, 3/2\tau, 5/2\tau$, and so on, which results in a deteriorated frequency characteristic of the reproduced summed sub-channels.

This deterioration in the frequency characteristic is due to the delay (or advance) between the sub-channel signals reproduced by heads 1A and 3A and the sub-channel signals reproduced by head 2A. If the sub-channel signal reproduced by head 2A is removed from the sum S(t), the signal-to-noise (S/N) ratio is degraded by a factor up to approximately $\sqrt{\frac{2}{3}}$. The embodiment shown in FIGS. 5A and 5B avoids a deteriorated frequency characteristic without degrading the S/N ratio. This is achieved by delaying the sub-channel signals reproduced by head 2A by the delay time $\tau$ and then adding this delayed signal to the sub-channel signals reproduced by heads 1A and 3A. Likewise, the sub-channel signals reproduced by head 6A are delayed by $\tau$ and added to the sub-channel signals reproduced by heads 5A and 7A. The resultant summed signal is an accurate reproduction of, for example, the left-channel (or, when heads 5A–7A are used, the right-channel) analog audio signal.

Turning to FIGS. 5A and 5B, the circuitry illustrated therein is similar to that discussed hereinabove in conjunction with FIGS. 1A and 1B and like reference numerals are used to identify the same elements. In the interest of brevity, further duplicative description is not provided. It will, of course, be appreciated that the embodiment shown in FIGS. 5A and 5B functions to reproduce digital audio signals in substantially the same way as that of the embodiment shown in FIGS. 1A and 1B. In the presently described embodiment, however, DC bias current generator 19 and AC bias clock generator 20 are not provide because the heads are not magnetoresistive. Furthermore, multiplier 5f, adder 5h and accumulator 5i included in waveform equalizer 5 are not used to recover the summed sub-channel signals as was done in the embodiment of FIGS. 1A and 1B. Rather, in the embodiment of FIGS. 5A and 5B, the output of ADC 4 is coupled directly to digital signal processor 14 by switch SW₂ when the apparatus is used to reproduce analog audio signals.

The digital signal processor shown in FIG. 5B is adapted to delay the sub-channel signal produced by head 2A (and also to delay the sub-channel signal produced by head 6A) by the time delay $\tau$, and then sum this delayed signal with the undelayed sub-channel signals recovered from heads 1A and 3A (or from heads 5A and 7A, as the case may be). Accordingly, digital signal processor 14 includes a programmable sequencer SEQ, an accumulator ACC, a left-channel register L-

REG, a right-channel register R-REG, an adder ADD and a random access memory RAM. The programmable sequencer operates in accordance with the programmed routine illustrated by the flow chart shown in FIG. 7 and now described.

Let it be assumed that ADC 4 digitizes the multiplexed analog audio signals in the manner shown in FIG. 4C. Let it be further assumed that sampling interval L-0 is produced at sampling interval k, sampling interval L-1 is produced at sampling interval k+1, sampling interval L-2 is produced at sampling interval k+2, and so on. In similar fashion, the right-channel sampling intervals R-0, R-1, R-2 are produced at sampling intervals k, k+1, k+2, and so on. It is appreciated that the time division multiplexed sub-channel samples are produce successively during each sampling interval. Now, when the routine of FIG. 7 begins, instruction ST-1 operates to read from the RAM sample $S_1(k-1)$ which is loaded into the accumulator. From FIG. 4C, it will be appreciated that this sample is derived from the sub-channel signal reproduced by head 1A during the $(k-1)$th interval.

The routine then advances to instruction ST-2, wherein sample $S_1(k)$, which is assumed to be the sample presently derived at the k-th interval from head 1A, is written into the RAM. The routine then advances to instruction ST-3, whereupon sample $S_2(k-1-n)$, which had been derived from head 2A during the $(k-1-n)$th interval and had been stored, is read from the RAM and loaded into the left-channel register. It is appreciated that this sample had been derived at $(1+n)$ sampling intervals preceding the present k-th sampling interval.

Thereafter, the routine advances to instruction ST-4, wherein the contents of the accumulator are summed with the contents of the left-channel register; and this sum is loaded into the accumulator. Hence, at this time, the accumulator is loaded with the following sum:

$$S_1(k-1)+S_2(k-1-n).$$

Advancing to instruction ST-5, the digitized sample $S_2(k)$, presently derived from head 2A, is written into the RAM. The routine then advances to instruction ST-6 wherein sample $S_3(k-1)$ is read from the RAM and written into the left-channel register. That is, the digitized sample produced at the $(k-1)$th sampling interval from the sub-channel signal reproduced by head 3A and which had been stored in the RAM now is stored in the left-channel register. Then, instruction ST-7 is carried out wherein the present contents of the accumulator are summed with the present contents of the left-channel register and the sum is loaded into the accumulator. Thus, the following sum is loaded into the accumulator:

$$S_1(k-1)+S_2(k-1-n)+S_3(k-1).$$

This sum, which is stored temporarily in the accumulator, then is written into the left-channel register, as indicated by instruction ST-8. Then, the routine advances to instruction ST-9 for writing into the RAM the k-th sample $S_3(k)$ presently derived from head 3A.

The illustrated routine is repeated for processing similar signals recovered from the right-channel analog audio signal by heads 5A, 6A and 7A. It is appreciated that after this routine is repeated, the right-channel register stores therein the following sum:

$$S_5(k-1)+S_6(k-1-n)+S_7(k-1).$$

It is recognized that the RAM stores the digitized multiplexed audio signals produced by ADC 4 at sampling intervals k, $(k-1)$, $(k-2)$, ... $(k-1-n)$, and so on. Selected ones of these stored digitized multiplexed audio signals are summed to recover a digitized representation of the original analog audio signals; and the value "n" is a function of the time delay $\tau$ caused by the displaced heads (2A, 6A) and the sampling interval $T_s$. That is, in the embodiment described herein, the digitized sample derived from head 2A (or the digitized sample derived from head 6A) that is n samples away from the digitized audio signals derived from heads 1A and 3A (or from heads 5A and 7A) is combined therewith to compensate for the delay $\tau$.

After the left-channel register and right-channel register are loaded with their respective summed sub-channels, the contents thereof are read out at instructions ST-(X-1) and ST-X, respectively, to be converted to analog form by DAC 16. If desired, separate left-channel and right-channel digital-to-analog converters may be used to convert the summed digitized left-channel and right-channel samples into analog samples. Thereafter, the routine returns to its initial instruction ST-1 to repeat the foregoing for the next sampling interval. Hence, after the L-0 and R-0 samples are processed in the foregoing manner, a similar processing is effected for the L-1 and R-1 samples.

By programming the programmable sequencer included in digital signal processor 14 in the manner illustrated in FIG. 7, the digital signal processor which normally is used to process digital audio signals can be used to recover analog audio signals that have been reproduced by digital heads and digitized by ADC 4. Accordingly, the analog audio signal may be reproduced with high sensitivity and improved frequency characteristics. The undesired characteristic illustrated in FIG. 13 is avoided by the embodiment discussed above.

Another embodiment of circuitry which can be used to recover analog audio signals that are reproduced by digital heads is illustrated in FIG. 8. For simplification, FIG. 8 illustrates only heads 1A, 2A and 3A adapted to reproduce the sub-channels included in, for example, the left-channel analog audio signal that may be recorded on tape TA. In the embodiment discussed, it is assumed that these digital heads are formed as bulk-type heads similar to those discussed above in conjunction with FIG. 6. Accordingly, although not shown in FIG. 8, it will be appreciated that head 2A is longitudinally displaced with respect to heads 1A and 3A.

The embodiment of FIG. 8 is comprised of a multiplexer 100, an analog-to-digital converter (ADC) 101, individual retiming or delay channels, a summing circuit 107 and a digital-to-analog (DAC) converter 110. Multiplexer 100 may be similar to aforedescribed multiplexer 3 and is supplied with a control signal for sampling, in succession, the analog audio signals reproduced by heads 1A, 2A and 3A and supplied thereto by amplifiers $2_1$, $2_2$ and $2_3$, respectively. Multiplexer 100 is coupled to ADC 101 which is adapted to digitize each multiplexed analog sample. The output of ADC 101 is coupled in common to the individual delay channels.

A first delay channel is comprised of a clocked flip-flop circuit, such as a D-type flip-flop circuit 102 supplied with a first phase $\phi_1$ of a timing signal whose frequency is, for example, $F_s/3$, wherein $F_s$ is the sampling frequency supplied to ADC 101 (and also is the frequency of the control signal supplied to multiplexer 100). D-type flip-flop circuit 102 is connected in cascade with D-type flip-flop circuits 105 and 106, these latter flip-flop circuits being supplied with clock pulse of a frequency equal to the sampling frequency $F_s$.

A second delay channel coupled to ADC 101 is comprised of a D-type flip-flop circuit 103 supplied with a second phase $\phi_2$ of the timing signal whose frequency is $F_s/3$. The output of D-type flip-flop circuit 103 is connected to a shift register 108 which also is supplied with the phase $\phi_2$ of the aforementioned timing signal; and the output of this shift register is coupled to another D-type flip-flop circuit 109 to which the clock signal of sampling frequency $F_s$ is supplied.

The third delay channel is comprised simply of a D-type flip-flop circuit 104 supplied with a third phase $\phi_3$ of the timing signal whose frequency is $F_s/3$. The respective outputs of the delay channels are coupled to summing circuit 107; and the output of this summing circuit is connected to DAC 110. This digital-to-analog converter is supplied with the third phase $\phi_3$ of the timing signal of frequency $F_s/3$ to produce an analog output. DAC 110 is coupled to a low pass filter 111 which smooths the analog output and supplies the resultant analog audio signal to an output terminal 112.

Figure 9:
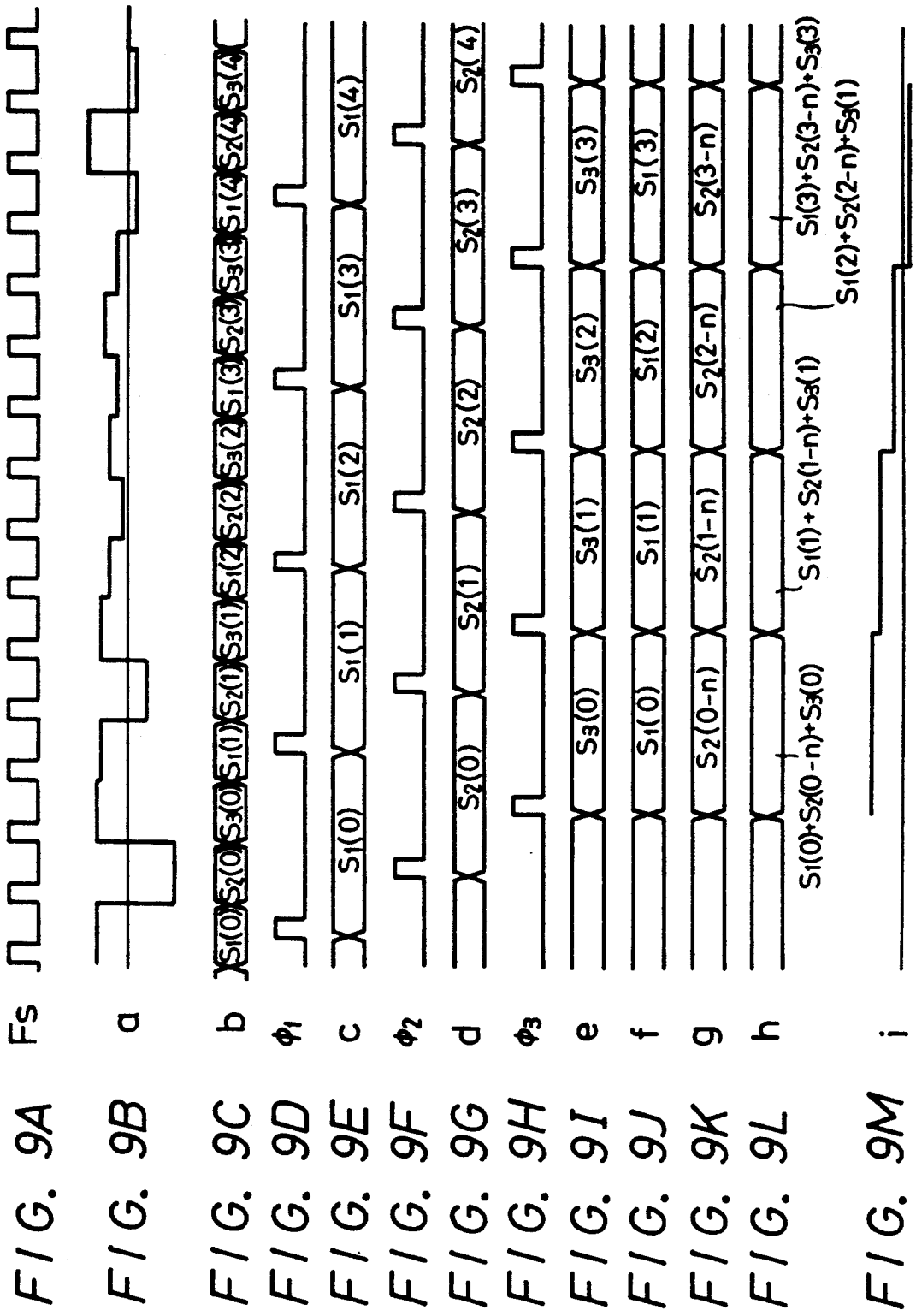

The manner in which the embodiment shown in FIG. 8 operates now will be described in conjunction with the timing waveforms shown in FIGS. 9A–9M. FIG. 9A illustrates the sampling clock frequency $F_s$. FIG. 9B illustrates the time division multiplexed analog audio signals reproduced by heads 1A, 2A and 3A. It will be appreciated that, because of the longitudinal displacement of head 2A relative to heads 1A and 3A, the sub-channel signals produced by heads 1A and 3A are delayed with respect to the sub-channel signal reproduced by head 2A. The multiplexed sub-channel signals shown in FIG. 9B are digitized by ADC 101, resulting in the successive digitized samples shown in FIG. 9C.

Phase $\phi_1$ of the timing signal shown in FIG. 9D clocks the digitized output of ADC 101 into D-type flip-flop circuit 102. From FIG. 9D, it is seen that phase $\phi_1$ coincides with the digitized samples recovered from head 1A. Hence, sample $S_1(0)$ first is clocked into D-type flip-flop circuit 102, followed by sample $S_1(1)$, followed by sample $S_1(2)$, and so on. FIG. 9E illustrates the output of D-type flip-flop circuit 102 which, at every phase $\phi_1$ comprises the next digitized sample recovered from head 1A. These digitized samples are re-clocked by D-type flip-flop circuits 105 and 106 so as to be time-shifted as shown in FIG. 9J.

The digitized samples produced by ADC 101 also are clocked into D-type flip-flop circuit 103 in response to phase $\phi_2$ of the timing signal shown in FIG. 9F. It is seen that phase $\phi_2$ coincides with samples $S_2(0)$, $S_2(1)$, $S_2(2)$, and so on. That is, phase $\phi_2$ coincides with the digitized samples recovered from head 2A.

The output of D-type flip-flop circuit 103 is illustrated in FIG. 9G and comprises successive samples derived from head 2A. Each such sample is shifted in shift register 108 in response to phase $\phi_2$ resulting in a delay time substantially equal to $\tau$. For example, shift register 108 may be comprised of n stages such that, after a sample is shifted therethrough, it is subjected to a time delay $\tau$. The shifted sample then is reclocked by D-type flip-flop circuit 109. As a result of the time delay produced by shift register 108 and the re-clocking provided by D-type flip-flop circuit 109, the delayed sample derived from head 2A is as shown in FIG. 9K. It will be appreciated that this delayed sample from head 2A now is in time coincidence with the sample derived from head 1A and re-clocked by D-type flip-flop circuits 105 and 106, as shown in FIG. 9J.

Finally, the digitized samples produced by ADC 101 are loaded into D-type flip-flop circuit 104 in response to phase $\phi_3$ of the timing signal shown in FIG. 9H. It is seen that this phase $\phi_3$ coincides with digitized samples $S_3(0)$, $S_3(1)$, $S_3(2)$, and so on. Accordingly, only the digitized samples derived from head 3A are clocked into D-type flip-flop circuit 104, as shown in FIG. 9I. It is seen that these samples which are extracted from the digitized multiplexed audio signals are in time coincidence with the samples derived from head 1A and the samples derived from head 2A (illustrated in FIGS. 9J and 9K, respectively). This time coincidence is attained because phase $\phi_1$ leads phase $\phi_3$ by two clock periods and phase $\phi_2$ leads phase $\phi_3$ by one clock period; and the digitized samples extracted by phase $\phi_1$ are delayed by two clock periods by D-type flip-flop circuits 105 and 106 and the digitized samples extracted by phase $\phi_2$ are delayed by one clock period by D-type flip-flop circuit 109. These delays imparted to the samples recovered from heads 1A and 2A thus result in time coincidence of the samples recovered from all three heads.

Furthermore, by delaying the samples recovered from head 2A by n stages in shift register 108, the n-th sample from head 2A is shifted by time delay $\tau$ into time coincidence with the samples then being reproduced by heads 1A and 3A because $\tau$ is a function of n and the frequency of the timing signal supplied to shift register 108. From FIGS. 9I, 9J and 9K, it is seen that sub-channnel samples $S_1(0)$, $S_2(0-n)$ and $S_3(0)$ are in time coincidence; and these coincident samples are summed in summing circuit 107. FIG. 9L represents the summation of these time coincident samples. Even though the sub-channel reproduced by head 2A is advanced relative to the sub-channels reproduced by heads 1A and 3A, the time delay imparted thereto by shift register 108 effectively cancels this advance.

The summed signals produced by summing circuit 107 are converted from digital to analog form by DAC 110, as represented by the waveform of FIG. 9M. The analog signal then is filtered to reproduce the original analog signal that had been recorded on the tape and played back in respective sub-channels by heads 1A, 2A and 3A.

Although the circuitry illustrated in FIG. 8 has been described in conjunction with the reproduction of only one channel of stereophonic analog signals, it will be appreciated that this same circuitry can be used to recover the other channel as well. For example, if multiplexer 100 is coupled to heads 5A, 6A and 7A, then the illustrated circuitry may be operated alternately to recover the left-channel audio signal and the right-channel audio signal. As a modification to the illustrated circuitry, another set of multiplexer, ADC and delay channels may be used to recover the right-channel audio signals. In any event, it is appreciated that the circuit arrangement shown in FIG. 8 and described in conjunction with FIGS. 9A to 9M operates to recover analog audio signals accurately and with good frequency characteristics even when using bulk-type magnetic heads.

FIG. 10 illustrates a simplified arrangement by which bulk-type magnetic heads, such as those used in the FIG. 8 embodiment, normally operative to reproduce digital signals are used to reproduce analog audio signals. As before, each head is assumed to reproduce a sub-channel of, for example, the left-channel (or the right-channel) audio signal recorded in a longitudinal track on tape TA. Since bulk-type magnetic heads are used, it also is assumed that head 2A is longitudinally displaced from heads 1A and 3A such that the sub-channel signals reproduced thereby are advanced from the sub-channel signals reproduced by heads 1A and 3A by the quantity $\tau$. The FIG. 10 arrangement serves to cancel this advance by delaying the signals recovered from head 2A by an equal amount $\tau$.

Here, three separate analog-to-digital converters (ADC's) are used. As shown, ADC 200 digitizes the sub-channel analog signals reproduced by head 1A, ADC 201 digitizes the sub-channel audio signals reproduced by head 2A and ADC 202 digitizes the sub-channel audio signals reproduced by head 3A. Preferably, each ADC is supplied with a sampling clock of frequency $F_s$. ADC 201 is coupled to a suitable digital delay circuit 203, such as a multi-stage shift register, which also is supplied with the clock frequency $F_s$. Delay circuit 203 functions to delay each digitized sample produced by ADC 201 by the time delay $\tau$. Hence, each digitized sample recovered from head 2A is sufficiently delayed as to be in time coincidence with the corresponding samples derived from adjacent sub-channels by heads 1A and 3A.

These time coincident samples are supplied to and summed in summing circuit 204, resulting in a reconstructed digitized signal representing the summation of the sub-channels recovered by heads 1A-3A. This reconstructed digital signal is converted to analog form by digital-to-analog converter 205 and supplied to an output terminal 207 by low pass filter 206. Hence, an analog signal corresponding to, for example, the left-channel signal reproduced by heads 1A-3A is supplied to output terminal 207. Alternatively, if the arrangement illustrated in FIG. 10 is used to reproduce the right-channel analog audio signal, the foregoing operation nevertheless is carried out to supply a reconstructed right-channel signal to the output terminal.

FIG. 11 illustrates a simple representation of the manner in which bulk-type magnetic heads which normally are used to reproduce digital audio signals can be used to recover a left-channel (or right-channel) analog audio signal. Assuming that head 2A is longitudinally displaced relative to heads 1A and 3A, thus reproducing a sub-channel of the analog audio signal having a relative time advance $\tau$, this sub-channel is supplied to an analog delay circuit 301 which exhibits a compensating time delay $\tau$. Hence, all of the analog sub-channels now are in time coincidence and may be summed by summing circuit 300 to recover the original left-channel (or right-channel) audio signal. The recovered signal is supplied to an output terminal 302 for further utilization. In this illustration, summing circuit 300 comprises an analog adder.

While the present invention has been particularly shown and described with reference to preferred embodiments, it will be readily appreciated by those of ordinary skill in the art that various changes and modifications may be made without departing from the spirit and scope of the invention. It is intended that the appended claims be interpreted as including such changes and modifications, additional alternatives and all equivalents thereto.

What is claimed is:

1. Apparatus for reproducing either M channels of digital audio signals recorded in longitudinal tracks on a record medium ($M \geq 2$) or an analog audio signal recorded in at least one longitudinal track on a record medium, whichever may be recorded, comprising:
    a plurality of heads for reproducing the M channels of digital audio signals or for reproducing the analog audio signal, whichever are recorded;
    multiplexer means coupled to said plurality of heads for multiplexing the digital audio signals or the analog audio signals as are reproduced by said heads;
    waveshaping means coupled to said multiplexer means for shaping the multiplexed digital audio signals, said waveshaping means including digitizing means for digitizing the multiplexed analog audio signals;
    waveform equalizer means coupled to said digitizing means for waveform equalizing a digitized audio signal recovered from said digital audio signals;
    processing means for summing digitized audio signals produced by said digitizing means when said plurality of heads reproduce an analog audio signal;
    means coupled to said waveform equalizer means for digitally processing the waveform equalized digitized audio signal recovered from said digital audio signals;
    digital filter means coupled to receive the summed digitized audio signals from said processing means when said plurality of heads reproduce an analog audio signal and to receive the digitally processed audio signals from said means for digitally processing the waveform equalized digitized audio signal when said plurality of heads reproduce digital audio signals; and
    digital-to-analog converter means coupled to said digital filter means for producing an analog audio signal in response to digital signals supplied thereto by said digital filter means.

2. The apparatus of claim 1 wherein said plurality of heads comprise plural magnetoresistive heads.

3. The apparatus of claim 2 wherein said plural magnetoresistive heads are aligned transversely to said longitudinal track.

4. The apparatus of claim 2 wherein said processing means is included in said waveform equalizer means and comprises synchronous detecting means for detecting the digitized audio signals recovered from said analog audio signal, and means coupled to said synchronous detecting means for summing a predetermined number of successive digitized audio signals produced by said digitizing means from said analog audio signals.

5. The apparatus of claim 4 further comprising AC bias clock generator means coupled to said magnetoresistive heads for supplying an AC bias clock signal thereto when an analog audio signal is reproduced; and wherein said synchronous detecting means comprises multiplier means coupled to said digitizing means and said AC bias clock generator means for multiplying the digitized audio signals with said AC bias clock signal when analog audio signals are reproduced.

6. The apparatus of claim 5 wherein said digitizing means includes a source of timing pulses of frequency $f_s$ and said AC bias clock signal comprises clock pulses of frequency $f_s/M$ having a duty cycle of 50%.

7. The apparatus of claim 5 wherein said analog audio signal comprises a left-channel signal recorded in one track and further comprising a right-channel signal recorded in a second track, said multiplexer means multiplexing the left-channel and right-channel signals reproduced by said plural heads; and wherein said digitizing means includes a source of timing pulses of frequency $f_s$ and said AC bias clock signal comprises clock pulses of frequency $f_s/2M$ having a duty cycle of 50%.

8. The apparatus of claim 4 wherein said means for summing comprises an adder and an accumulator connected such that the contents of said accumulator are summed in said adder with a digitized audio signal and the summed signals are loaded into said accumulator to be summed with the digitized audio signal next produced by said ADC means.

9. The apparatus of claim 1 wherein M heads reproduce said M channels of digital audio signals and N heads ($2 \leq N \leq M$) reproduce said analog audio signal.

10. The apparatus of claim 1 wherein at least one of said plurality of heads is displaced relative to the other heads in a longitudinal direction such that a relative time shift $\tau$ is imparted between the signals reproduced by the displaced heads and the signals reproduced by the other heads.

11. The apparatus of claim 10 wherein said processing means includes delay means for selectively delaying by a predetermined amount the digitized audio signals recovered from the analog audio signals reproduced by the displaced heads.

12. The apparatus of claim 11 wherein said delay means imparts a time delay $\tau$ to the digitized audio signals.

13. The apparatus of claim 12 wherein said processing means comprises storage means for storing digitized multiplexed audio signals produced by said ADC means at plural sampling intervals k, (k−1), (k−2), ... (k−1−n) ... ; and accumulator means for accumulating the sum of the digitized audio signals recovered from said other heads at the (k−1) sampling interval and the digitized audio signals recovered from said displaced heads at the (k−1−n) sampling interval.

14. The apparatus of claim 13 wherein n is a function of said delay $\tau$ and said sampling interval.

15. Apparatus for reproducing either M channels of digital audio signals recorded in longitudinal tracks on a record medium or an analog audio signal recorded in one longitudinal track on a record medium, comprising:
a plurality of heads for reproducing the M channels of digital audio signals or the analog audio signal, with at least one of said heads being displaced relative to the other heads in a longitudinal direction such that a relative time shift $\tau$ is imparted between the audio signals reproduced by the displaced heads and the audio signals reproduced by the other heads;
delay means for delaying the audio signals reproduced by the displaced heads relative to the audio signals reproduced by the other heads to minimize said time shift $\tau$; and
summing means for summing the audio signals reproduced by said other heads and the delayed audio signals to recover the analog audio signal recorded in said one track.

16. The apparatus of claim 15, further comprising multiplexer means for multiplexing analog audio signals reproduced by said displaced and other heads; and analog-to-digital converter means for digitizing the multiplexed analog audio signals to supply said delay means with successive samples of the digitized audio signals.

17. The apparatus of claim 16 wherein said delay means comprises plural delay channels, each including at least one clocked latch circuit for storing a respective sample of the digitized, multiplexed analog audio signals.

18. The apparatus of claim 17 wherein those delay channels which store samples from the displaced heads further include shift means for shifting the samples supplied thereto by an amount equal to $\tau$.

19. The apparatus of claim 18 wherein those delay channels which store samples from the other heads further include retiming means for selectively retiming said samples from the other heads such that respective samples from said other heads are brought into time coincidence.

20. The apparatus of claim 19 wherein said summing means comprises digital adding means coupled to said plural delay channels for adding the time coincident samples produced thereby.

21. The apparatus of claim 20 further comprising digital-to-analog converter means coupled to said digital adding means for converting the added samples to analog form.

22. Apparatus for reproducing either M channels of digital audio signals recorded in longitudinal tracks on a record medium ($M \geq 2$) or left-channel (L) and right-channel (R) analog audio signals recorded in respective longitudinal tracks on a record medium, whichever may be recorded, comprising:
M magnetoresistive heads for reproducing the M channels of digital audio signals, with N of said magnetoresistive heads ($N \leq M$) reproducing the L and R analog audio signals in the event that analog audio signals and not digital audio signals are recorded;
multiplexer means coupled to said M heads for multiplexing the M channels of digital audio signals to provide digitized samples thereof or for multiplexing N channels of L and R analog audio signals;
digitizing means coupled to said multiplexer means for shaping the M multiplexed channels of digitized samples recovered from the digital audio signals, said digitizing means including analog-to-digital converter (ADC) means for producing digitized samples of the N multiplexed channels of L and R analog audio signals when analog audio signals are reproduced;
waveform equalizer means coupled to said digitizing means and including summing means normally operable to equalize digitized waveform samples recovered from said digital audio signals and selectively operable when analog audio signals are reproduced to sum N/2 digitized samples of L analog audio signals and to sum N/2 digitized samples of R analog audio signals;
data detecting means coupled to said waveform equalizer means for producing M data channels of digital audio signals;
digital signal processing means coupled to said data detecting means when said heads reproduce digital audio signals for demodulating said M data channels of digital audio signals, said digital signal processing means being coupled to said summing means when said heads reproduce analog audio signals for providing the summed L signals and the summed R signals; and digital-to-analog converter (DAC) means coupled to said digital processing means to convert to analog form the digitized signals supplied thereto.

23. The apparatus of claim 22 wherein said waveform equalizer means further includes multiplying means normally operable to multiply the digitized samples recovered from said digital audio signals by selected predetermined coefficients and operable when analog audio signals are reproduced to detect the digitized samples recovered from said analog audio signals.

24. The apparatus of claim 23 further comprising AC bias clock generator means coupled to said magnetoresistive heads for supplying an AC bias clock signal thereto when an analog audio signal is reproduced and for supplying said AC bias clock signal to said multiplying means for detecting the digitized samples recovered from said analog audio signals.

25. The apparatus of claim 24 wherein said summing means comprises an adder coupled to receive signals produced by said multiplying means, an accumulator for receiving signals produced by said adder, and feedback means for feeding back to said adder signals accumulated in said accumulator; whereby when said heads reproduce analog audio signals, a digitized sample produced by said ADC means is summed with the signals accumulated in said accumulator means and the summed signals are loaded into said accumulator means to be summed with the next digitized sample produced by said ADC means.

26. The apparatus of claim 25 further comprising means for clearing said accumulator means after the N/2th digitized sample produced by said ADC means is summed with the signals accumulated in said accumulator means and the summed signals have been loaded into said accumulator means.

27. Apparatus for reproducing either M channels of digital audio signals recorded in longitudinal tracks on a record medium or left-channel (L) and right-channel (R) analog audio signals recorded in respective longitudinal tracks on a record medium, comprising:

M heads for reproducing the M channels of digital audio signals, N of said M heads ($N \leq M$) reproducing the L and R analog audio signals and at least one of said N heads being displaced relative to the other heads in a longitudinal direction such that a relative time shift $\tau$ is imparted between the audio signals reproduced by the displaced heads and the audio signals reproduced by said other heads;

multiplexer means coupled to said M heads for multiplexing the M channels of digital audio signals or N channels of L and R analog audio signals;

analog-to-digital converter (ADC) means coupled to said multiplexer means for producing digitized samples of the M multiplexed channels of digitized audio signals or of the N multiplexed channels of L and R analog audio signals;

data processing and detecting means coupled to said ADC means and normally operative to process the digitized samples of said M multiplexed channels for producing M data channels of digital audio signals;

digital signal processing means coupled to said data processing and detecting means when said heads reproduce digital audio signals for demodulating said M data channels of digital audio signals, said digital signal processing means including delay and summing means coupled to said ADC means when said heads reproduce analog audio signals for delaying selected ones of N/2 digitized samples of the L analog audio signal reproduced by the displaced heads and for delaying selected ones of N/2 digitized samples of the R analog audio signal reproduced by the displaced heads to substantially eliminate said time shift $\tau$, and for summing the delayed and undelayed digitized samples of the L analog audio signal and for summing the delayed and undelayed digitized samples of the R analog audio signal; and digital-to analog converter (DAC) means coupled to said digital signal processing means to convert to analog form the summed digitized samples produced by said digital signal processing means.

28. The apparatus of claim 27 wherein said delay and summing means comprises storage means for storing digitized samples produced from said N heads at plurality sampling intervals k, (k−1), (k−2), ... (k−1−n), ...; and accumulator means for accumulating the sum of the digitized samples produced from said other heads at the (k−1) sampling interval and the digitized samples produced by said displaced heads at the (k−1−n) sampling interval; where n is a function of said delay $\tau$ and said sampling interval.

* * * * *